(12) United States Patent
Kotani

(10) Patent No.: US 8,346,986 B2
(45) Date of Patent: *Jan. 1, 2013

(54) DISPLAY APPARATUS, CONTROL METHOD THEREOF, AND PROGRAM

(75) Inventor: Junji Kotani, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/281,543

(22) Filed: Oct. 26, 2011

(65) Prior Publication Data

US 2012/0144070 A1 Jun. 7, 2012

Related U.S. Application Data

(60) Division of application No. 12/545,270, filed on Aug. 21, 2009, now Pat. No. 8,078,767, which is a continuation of application No. PCT/JP2009/055381, filed on Mar. 24, 2009.

(30) Foreign Application Priority Data

May 29, 2008 (JP) ................................. 2008-141678

(51) Int. Cl.
   *G06F 13/10* (2006.01)
(52) U.S. Cl. .................. 710/8; 710/14; 710/15; 710/16
(58) Field of Classification Search ........................ None
    See application file for complete search history.

(56) References Cited

U.S. PATENT DOCUMENTS

| 6,804,727 | B1 | 10/2004 | Rademacher |
|---|---|---|---|
| 2005/0060447 | A1 | 3/2005 | Tanaka |
| 2007/0088806 | A1 | 4/2007 | Marriott et al. |
| 2007/0162949 | A1 | 7/2007 | Nitta et al. |
| 2008/0071937 | A1 | 3/2008 | Yoshida |
| 2008/0148138 | A1 | 6/2008 | Sparrell |
| 2011/0167140 | A1 | 7/2011 | Marriott et al. |

FOREIGN PATENT DOCUMENTS

| JP | 07-123379 A | 5/1995 |
|---|---|---|
| JP | 2002-271721 A | 9/2002 |
| JP | 2004-350160 A | 12/2004 |
| JP | 2005-333416 A | 12/2005 |

(Continued)

OTHER PUBLICATIONS

European Search Report dated Jul. 11, 2012, in related corresponding European Patent Application No. 09754506.5.

(Continued)

*Primary Examiner* — Ilwoo Park
(74) *Attorney, Agent, or Firm* — Fitzpatrick, Cella, Harper & Scinto

(57) ABSTRACT

A display apparatus includes a communication unit configured to communicate with an external device, a display unit configured to display an image received from the external device, and a storing unit configured to store information for controlling whether or not to continue the display of the image being displayed by the display unit when the communication is disconnected. In addition, a determination unit determines whether or not to continue the display of the image received from the external device by comparing the type of the external device involving the communication by the communication unit with the information stored in the storing unit, and a control unit controls whether or not to continue the display of the image being displayed by the display unit when the communication is disconnected, in accordance with the determination.

11 Claims, 28 Drawing Sheets

| | FOREIGN PATENT DOCUMENTS | | | KR | 20070069016 A | 7/2007 |
|----|----|----|----|----|----|----|
| JP | 2006-185288 A | 7/2006 | | WO | 2005/111820 A1 | 11/2005 |
| JP | 2006-235993 A | 9/2006 | | | | |
| JP | 2006-285070 A | 10/2006 | | | | |
| JP | 2007-279144 A | 10/2007 | | | | |
| JP | 2008-282160 A | 11/2008 | | | | |

OTHER PUBLICATIONS

Korean Office Action dated Mar. 9, 2012, in related Korean Patent Application No. 10-2010-7025011.

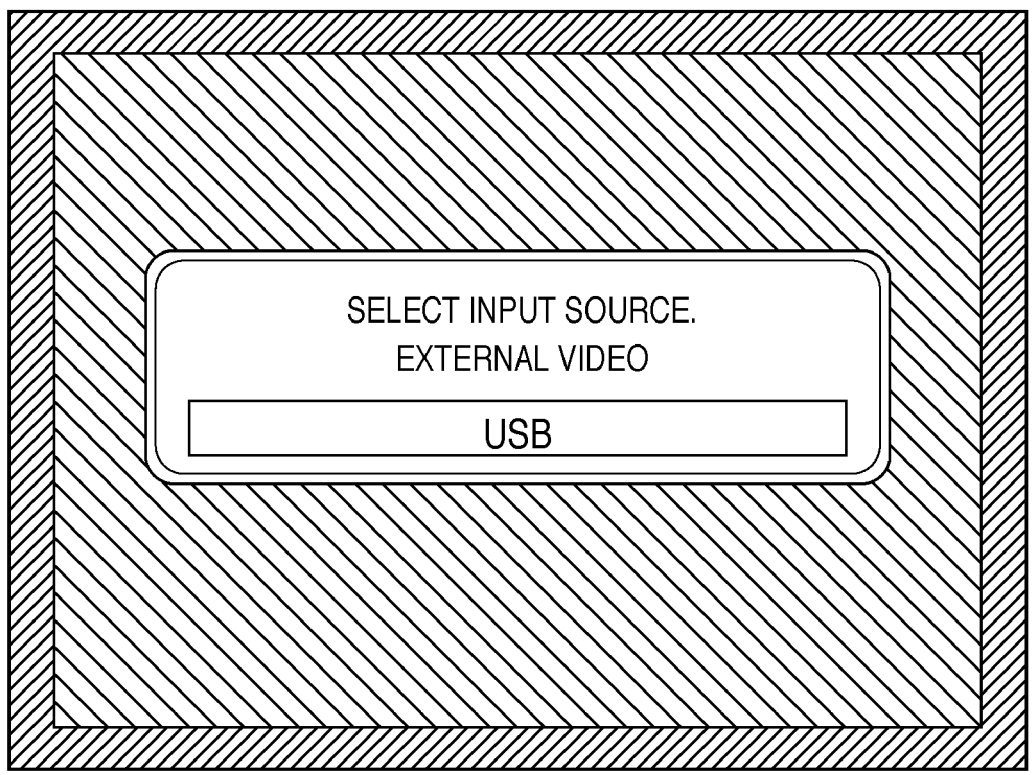
F I G. 3

F I G. 4B-2
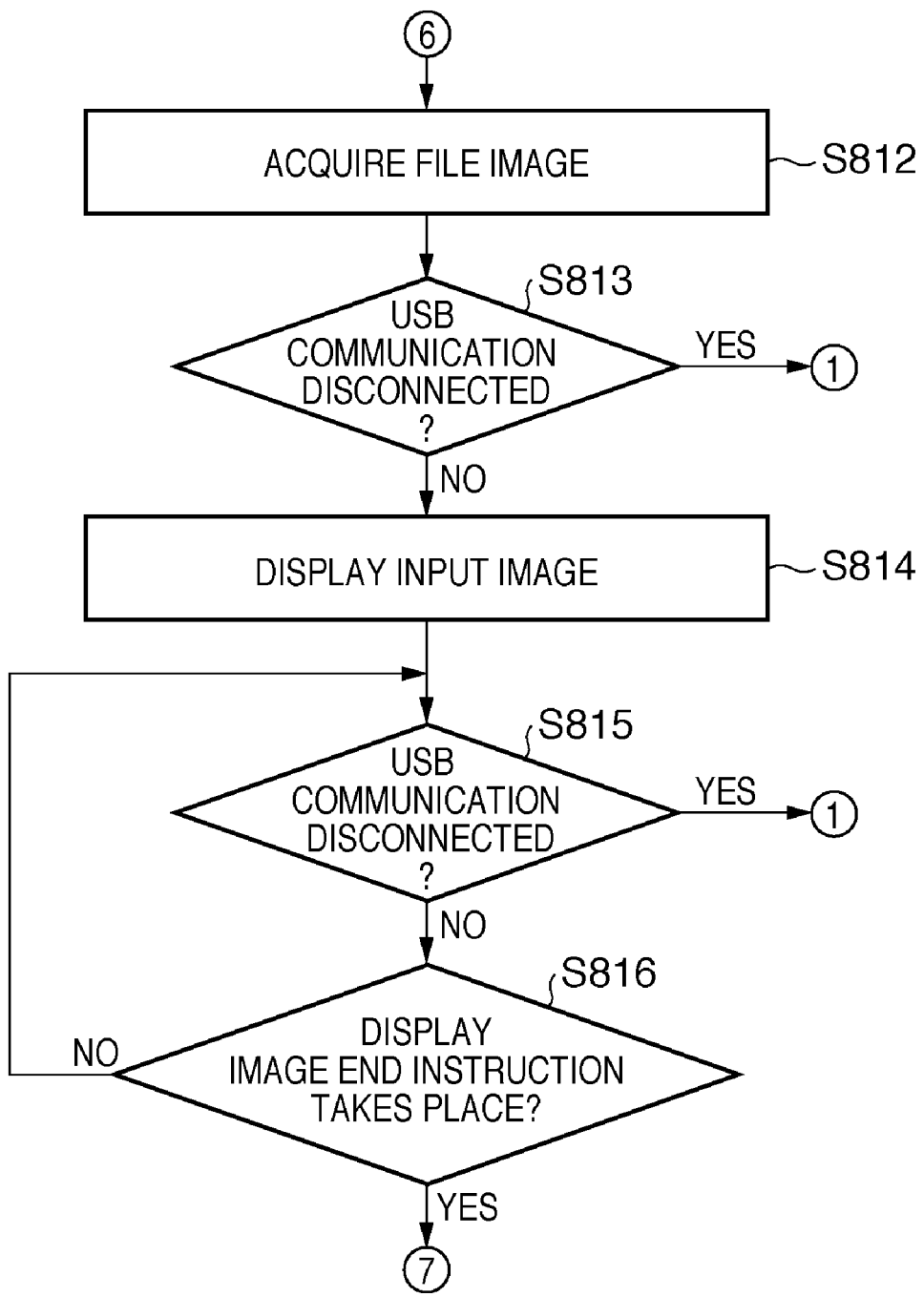

F I G. 14A
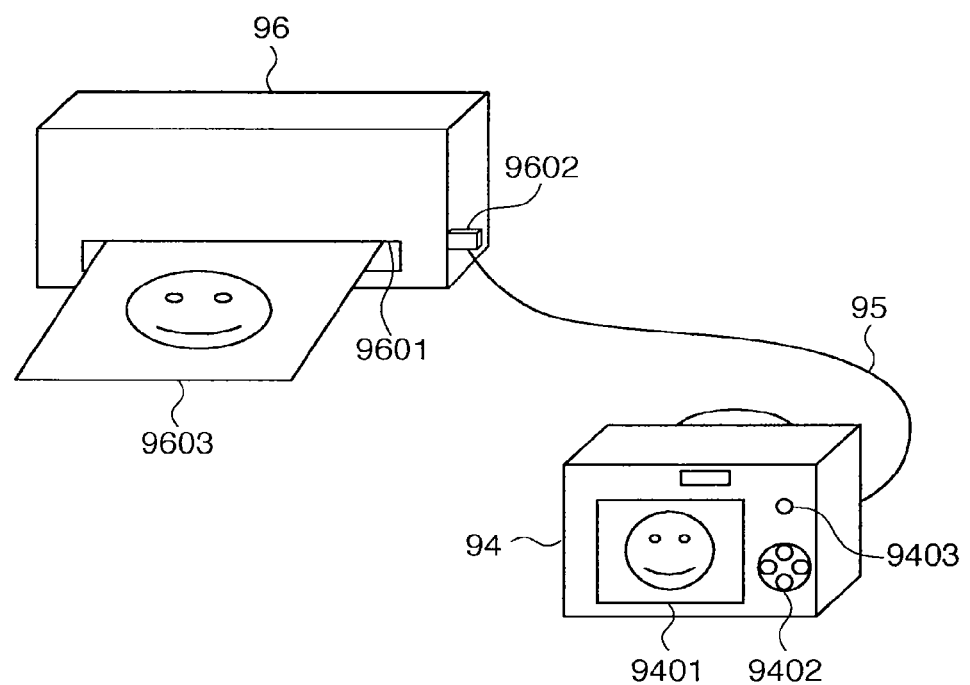

DISPLAY APPARATUS, CONTROL METHOD THEREOF, AND PROGRAM

This application is a divisional of application Ser. No. 12/545,270, filed Aug. 21, 2009, which is a continuation of PCT Application No. PCT/JP/2009/055831, filed Mar. 24, 2009.

TECHNICAL FIELD

The present invention relates to a display apparatus, a control method thereof, and a program.

BACKGROUND ART

Conventionally, a display apparatus such as a projector is connected to various devices via, for example, USB (Universal Serial Bus), and displays image data transmitted from these connected devices. Various devices connected to the display apparatus include a semiconductor memory device such as a flash memory device, a PC (Personal Computer), a digital still camera (to be referred to as a "digital camera" hereinafter), and the like.

A case will be explained first with reference to FIGS. 11A to 13C wherein a flash memory as a semiconductor memory device is connected to a projector as a display apparatus, and image data stored in that flash memory is displayed on the projector. FIG. 11A is a schematic view showing an overview when a flash memory 93 is connected to a conventional projector 91 to display an image. FIG. 11B is a schematic view showing details of a control panel 9101. FIG. 12 is a sequence chart showing the operation sequence executed when the flash memory 93 is connected to the projector 91 to display an image. FIGS. 13A to 13C are schematic views exemplifying images to be projected by the projector 91 onto a screen 92.

As shown in FIG. 11A, the projector 91 has the control panel 9101 and a USB connector 9102. As shown in FIG. 11B, the control panel 9101 has an up arrow button 9011, left arrow button 9012, down arrow button 9013, right arrow button 9014, enter button 9015, input button 9016, and power button 9017. The projector 91 accepts operation instructions from the user from various buttons on the control panel 9101. The USB connector 9102 receives the flash memory 93 having a USB connection terminal. This flash memory 93 stores image data to be displayed by the projector 91. By the user plugging the flash memory 93 into the USB connector 9102 and operating the control panel 9101, he or she can browse image data stored in the flash memory 93 as an image 921 on the screen 92.

The operation sequence among the user, flash memory 93, and projector 91 will be described below. Assume that the projector 91 is powered, and the flash memory 93 is not connected to the projector 91 in an advance state. As shown in FIG. 12, the operation sequence by the user, flash memory 93, and projector 91 mainly include steps S200 to S210 which are executed in turn. In step S200, the projector 91 displays a connection request window that requests the user to connect the flash memory 93 to the USB connector 9102 by projecting that window on the screen 92. The connection request window in step S200 displays a message that prompts the user to connect the flash memory 93 as a USB device, as shown in FIG. 13A.

In step S201, the user connects the flash memory 93 to the USB connector 9102. In step S202, a USB communication is established based on the USB standard between the projector 91 and flash memory 93 which are physically connected via the USB connector 102. In this case, the projector 91 recognizes the flash memory 93 as Mass Storage Class based on the USB standard.

In step S203, the projector 91 reads directory entry information stored in the flash memory 93. In step S204, the projector 91 displays a file selection window that prompts the user to select an image file to be displayed by projecting that window on the screen 92. The file selection window in step S204 is as shown in FIG. 13B, and is a window that displays a file name list of image files stored in the flash memory 93, and a cursor used to select them.

In step S205, the user who confirmed the aforementioned file selection window selects an image file to be displayed by operating the control panel 9101 and issues a display instruction to the projector 91. For example, in step S205 the user gives an instruction to move the cursor by pressing the up or down arrow button 9011 or 9013 on the control panel 9101, and issues a display instruction of an image file selected by the cursor by pressing the enter button 9015.

In step S206, the projector 91 reads data of the image file designated in step S205 from the flash memory 93. In step S207, the projector 91 displays an image based on the image file read in step S206 by projecting that image on the screen 92. As the image displayed in step S207, image data of a landscape or the like captured using a digital camera is stored in advance in the flash memory 93, as shown in FIG. 13C.

In step S208, the user issues a display end instruction to the projector 91 by operating the control panel 9101. More specifically, when the user presses the enter button 9015, a display end instruction is issued to the projector 91. Note that the operations for accepting selection of an image file by the user and displaying the selected image file can be repeated by repeating steps S204 to S208 bounded by the broken line in FIG. 12.

In step S209, the user removes the flash memory 93 from the USB connector 9102. In step S210, the projector 91 clears a display image projected onto the screen 92 (or overwrites the image by a predetermined image such as a menu window) due to removal of the flash memory 93 in step S209. For example, in step S210 the connection request window shown in FIG. 13A is overwritten on an image displayed in steps S204 to S208. As a result, the projector 91 can prompt the user to connect the next device. The user removes the flash memory 93 with the intention to end browsing of image files stored in the flash memory 93. Therefore, since the projector 91 clears an image displayed in steps S204 to S208, it can attain an image display operation according to the user's intention.

Note that patent reference 1 is known as a technique of clearing (overwriting) a display image by a predetermined image in step S210 above. Patent reference 1 discloses a technique for clearing a display image at the end of a communication and a technique for clearing a previous display image at the beginning of a communication.

A case will be exemplified below wherein another example of various devices to be connected is a digital camera. Note that a case will be exemplified below with reference to FIGS. 14A and 14B, and FIG. 15 wherein a digital camera is connected to a printer, and the printer outputs an image based on image data stored in that digital camera. As a typical example in this case, the CIPA DC-001-2003 standard (to be referred to as "PictBridge" hereinafter) is available. In a method of outputting an image using this PictBridge, even a user unskilled in operations of devices such as PCs can output an image using a printer by readily operating a digital camera. An image output operation using the PictBridge will be described below.

FIG. 14A is a schematic view showing an overview when a digital camera 94 is connected to a printer 96 to output an image. FIG. 14B is a block diagram showing the arrangement associated with a communication between the printer 96 and digital camera 94. FIG. 15 is a sequence chart showing the operation sequence when the digital camera 94 is connected to the printer 96 to output an image.

As shown in FIG. 14A, the printer 96 has a discharge port 9601 and USB connector 9602. The discharge port 9601 discharges a paper sheet 9603 after image formation. To the USB connector 9602, the digital camera 94 is connected via a USB cable 95. The digital camera 94 has a liquid crystal panel screen 9401, operation member 9402, and PictBridge button 9403. The liquid crystal panel screen 9401 displays a preview of an image or the like transferred via the PictBridge. The operation member 9402 accepts an image selection instruction from the user. The PictBridge button 9403 is a button which accepts an instruction to start PictBridge transfer from the user. An image based on image data stored in the digital camera 94 is output onto a paper sheet in the printer 96 in such a manner that an image output instruction is output to the printer 96 by an operation on the digital camera 94 side, and image data to be output is transmitted from the digital camera 94 to the printer 96.

The operation sequence among the user, digital camera 94, and printer 96 will be described below. As shown in FIG. 15, the operation sequence by the user, digital camera 94, and printer 96 mainly includes steps S500 to S509, which are executed in turn. In step S500, the user connects the digital camera 94 and printer 96 via the USB cable 95. In step S501, a USB communication is established based on the USB standard between the digital camera 94 and printer 96 which are physically connected via the USB cable 95. In this case, the printer 96 recognizes the digital camera 94 as a capture device of Imaging Class based on the USB standard.

In step S502, a PictBridge connection is established between the digital camera 94 and printer 96. More specifically, a connection is established in a PTP (Picture Transfer Protocol) layer, device information is exchanged, and so forth. Then, a communication state as a PictBridge sequence transits to an idle state, and the printer 96 waits for issuance of a print job by the digital camera 94.

In step S503, the user issues a print instruction via the PictBridge by operating the digital camera 94. More specifically, this print instruction in step S503 is issued when the user presses the PictBridge button 9403. In step S504, the digital camera 94 transmits a PictBridge print job to the printer 96 based on the print instruction in step S503, and the printer 96 starts the operation of that print job.

In step S505, the printer 96 requests the digital camera 94 to transmit file information to be printed in accordance with the print job in step S504, and acquires that file information. Likewise, in step S506 the printer 96 requests the digital camera 94 to transmit a file image (image data) to be printed in accordance with the print job in step S504, and acquires that file image.

In step S507, the printer 96 executes decoding, scaling, print processing, and the like of an image indicated by the file acquired in steps S505 and S506, and outputs the paper sheet 9603 after image formation from the discharge port 9601. In step S508, the printer 96 notifies the digital camera 94 of an idle state upon completion of the print job. Note that the operations for accepting selection of an image to be printed from the user, and printing out the selected image can be repeated by repeating steps S503 to S508 bounded by the broken line in FIG. 15.

In step S509, the user removes the USB cable 95 from the printer 96 or digital camera 94. Note that a device, which can control a communication session and logically disconnects a communication connection like the digital camera 94, often disconnects a communication like closing of a communication session in addition to a physical communication disconnection by, for example, removal of the USB cable 95. For example, when the battery remaining amount lowers during the aforementioned PictBridge sequence, the digital camera 94 side may execute control for disconnecting a USB communication so as to reduce consumption power.

A communication disconnection on the digital camera 94 side will be explained below by exemplifying the arrangement associated with a communication between the digital camera 94 and printer 96. As shown in FIG. 14B, a USB host controller 9604 on the printer 96 side is connected to a USB device controller 9407 on the digital camera 94 side via the USB cable 95. The USB cable 95 includes four signal lines, that is, a VBUS line 9501, D+ line 9502, D− line 9503, and GND line 9504.

The D+ line 9502 and D− line 9503 are used to transmit differential signals required to make a USB data communication, and also indicate a device connection state by a voltage in a steady state. The D+ line 9502 and D− line 9503 are respectively pulled down by resistors 9606 and 9605 on the printer 96 side, and indicate a Low voltage when no USB cable is connected. Thus, the printer 96 recognizes a USB non-connection state. On the other hand, when the printer 96 and digital camera 94 are connected, the D+ line 9502 is pulled up by a resistor 9406 via a switch 9405 on the digital camera 94 side. Then, when the switch 9405 is in a connection state, the D+ line 9502 indicates a High voltage. As a result, the printer 96 recognizes a USB connection state.

A CPU 9404 controls the switch 9405 on the digital camera 94 side. Note that the CPU 9404 executes the following processing for the purpose of, for example, reducing consumption power of the digital camera 94. For example, in step S508 in which the PictBridge sequence transits to an idle state upon completion of the print job, the CPU 9404 controls the switch 9405 on the digital camera 94 side to stop to pull up the D+ line 9502. In this case, the D+ line 9502 indicates a Low voltage since it is pulled down on the printer 96 side. For this reason, the USB host controller 9604 recognizes a USB non-connection state and disconnects a USB communication, since this state is electrically equivalent to cable removal in association with the D+ line 9502. That is, the communication session between the digital camera 94 and printer 96 is closed by the control on the digital camera 94 side for the purpose of, for example, reducing consumption power.

When a communication disconnection is made on the digital camera 94 side, as described above, the user meets the same behavior as that when the USB cable 95 is removed at the end of the print processing of the printer 96. That is, the PictBridge sequence reaches the same state as that when the process reaches step S509.

Note that the PictBridge that assumes printing has been exemplified, but the PictBridge is applicable to a display on a display apparatus such as a projector or television. For example, when the digital camera 94 is connected to the projector 91 to display an image, as shown in FIG. 16, the PictBridge allows the projector 91 to project and display an image transmitted from the digital camera 94 by a simple operation on the digital camera 94 side. Like in the case in which the printer 96 and digital camera 94 are connected, when a communication is disconnected on the digital camera 94 side, the user meets the same behavior as that when the USB cable 95 is removed. That is, the projector 91 clears an image which was transmitted from the digital camera 94 and was displayed immediately before the communication disconnection by displaying, for example, the connection request window.

As a technique for disconnecting a USB communication from the device side, patent reference 2 is known. Patent reference 2 discloses a technique for disconnecting a communication by stopping to pull up a data line on the device side based on a disconnection instruction from the host side.

Patent Reference 1: Japanese Patent Laid-Open No. 7-123379
Patent Reference 2: Japanese Patent Laid-Open No. 2006-235993

DISCLOSURE OF THE INVENTION

Problems that the Invention is to Solve

As described above, the conventional display apparatus can be connected to various devices, and can display image data stored in a connected device. However, independently of the device class to be connected, when a communication is disconnected, the display operation of an image transmitted from that device ends. For this reason, in addition to the image display end operation that the user intended by removing the flash memory or USB cable, the image display operation often ends without the intention of the user by the control on the device side that logically disconnects a communication connection.

The present invention handles at least one of such conventional problems. That is, the present invention provides a display apparatus, which can control to continue or end a display operation according to a device class when a communication connection with a device is disconnected during execution of the display operation based on data transmitted from the connected device, a control method thereof, and a program.

Means of Solving the Problems

According to the first invention of the present application, there is provided a display apparatus characterized by comprising a display unit, a connection unit configured to connect an external device to be able to communicate with the external device, and a control unit configured to control the display unit to make a display based on data received from the external device with which a communication connection is established via the connection unit, characterized in that the control unit acquires class information indicating a class of the external device from the external device via the connection unit, controls the display unit to continue the display based on the data received from the external device at the time of disconnection of the communication connection with the external device if the class of the external device indicated by the class information is a predetermined class, and controls the display unit to end the display based on the data received from the external device at the time of disconnection of the communication connection with the external device if the class of the external device indicated by the class information is not the predetermined class.

According to the second invention of the present application, there is provided a control method of a display apparatus which comprises a display unit, a connection unit configured to connect an external device to be able to communicate with the external device, and a control unit configured to control the display unit to make a display based on data received from the external device with which a communication connection is established via the connection unit, the method characterized by comprising the control step of acquiring class information indicating a class of the external device from the external device via the connection unit, controlling the display unit to continue the display based on the data received from the external device at the time of disconnection of the communication connection with the external device if the class of the external device indicated by the class information is a predetermined class, and controlling the display unit to end the display based on the data received from the external device at the time of disconnection of the communication connection with the external device if the class of the external device indicated by the class information is not the predetermined class.

According to the third invention of the present application, there is provided a display apparatus characterized by comprising a display unit, a connection unit configured to connect an external device to be able to communicate with the external device, and a control unit configured to control the display unit to make a display based on data received from the external device with which a communication connection is established via the connection unit, characterized in that the control unit acquires class information indicating a class of the external device from the external device via the connection unit, controls the display unit to end the display based on the data received from the external device at the time of disconnection of the communication connection with the external device if the class of the external device indicated by the class information is a predetermined class, and controls the display unit to continue the display based on the data received from the external device at the time of disconnection of the communication connection with the external device if the class of the external device indicated by the class information is not the predetermined class.

According to the fourth invention of the present application, there is provided a control method of a display apparatus which comprises a display unit, a connection unit configured to connect an external device to be able to communicate with the external device, and a control unit configured to control the display unit to make a display based on data received from the external device with which a communication connection is established via the connection unit, the method characterized by comprising the control step of acquiring class information indicating a class of the external device from the external device via the connection unit, controlling the display unit to end the display based on the data received from the external device at the time of disconnection of the communication connection with the external device if the class of the external device indicated by the class information is a predetermined class, and controlling the display unit to continue the display based on the data received from the external device at the time of disconnection of the communication connection with the external device if the class of the external device indicated by the class information is not the predetermined class.

Effects of the Invention

According to the present invention, when a communication connection with a device is disconnected during execution of a display operation based on data transmitted from the connected device, the display operation can be controlled to continue or end according to the device class.

Other features and advantages of the present invention will become apparent from the following description taken in conjunction with the accompanying drawings. Note that the same reference numerals denote the same or similar components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a schematic view exemplifying an input selection menu window;

FIG. 4B2 is a flowchart showing the sequel of FIG. 4B1;

FIG. 4C1 is a flowchart showing the processing of the display apparatus when "Imaging Class" is determined in step S804 in FIG. 4A;

FIG. 4C2 is a flowchart showing the sequel of FIG. 4C1;

FIG. 8B1 is a flowchart showing processing of the second modification (corresponding to FIG. 4B1) in the display apparatus;

FIG. 8B2 is a flowchart showing processing of the second modification (corresponding to FIG. 4B2) in the display apparatus;

FIG. 8C1 is a flowchart showing processing of the second modification (corresponding to FIG. 4C1) in the display apparatus;

FIG. 8C2 is a flowchart showing processing of the second modification (corresponding to FIG. 4C2) in the display apparatus;

FIG. 14A is a schematic view showing an overview when a digital camera is connected to a printer to output an image;

DESCRIPTION OF REFERENCE NUMERALS

1 . . . display apparatus
2 . . . screen
3 . . . flash memory
4 . . . digital camera
5 . . . USB cable

BEST MODE FOR CARRYING OUT THE INVENTION

An embodiment of the present invention will be described hereinafter with reference to the drawings, but the present invention is not limited to the embodiment to be described hereinafter. The embodiment of the present invention presents one aspect of the invention, and does not limit the scope of the invention.

Figure 1A:
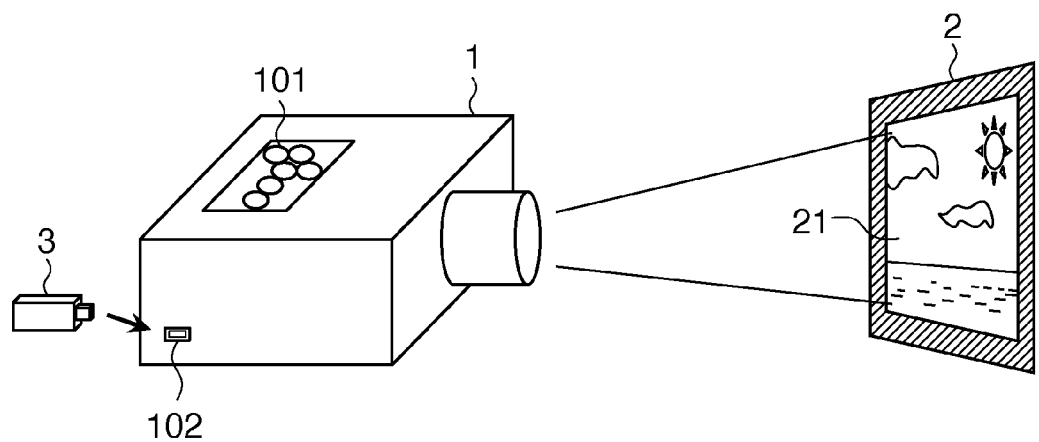
FIG. 1A is a view exemplifying a use mode of a display apparatus according to the present invention, that is, a schematic view exemplifying a use mode upon connecting a flash memory to a display apparatus to display an image.

A use mode of a display apparatus according to the present invention will be described first with reference to FIGS. 1A and 1B which exemplify the use modes of a display apparatus 1. As shown in FIG. 1A, as a use mode of the display apparatus 1, a flash memory 3 is connected to a USB connector 102 of the display apparatus 1, and an image stored in the flash memory 3 is projected and displayed as an image 21 on a screen 2. A control panel 101 includes various buttons used to accept operation instructions from the user. The user can browse image data stored in the flash memory 3 as the image 21 on the screen 2 by plugging the flash memory 3 into the USB connector 102 and operating the control panel 101.

Figure 1B:
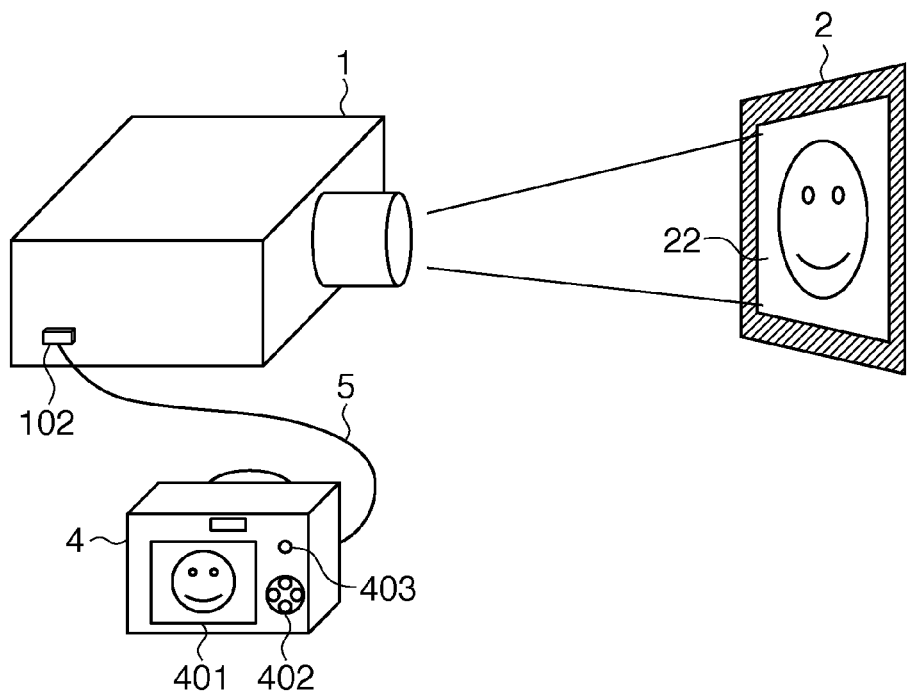
FIG. 1B is a view exemplifying a use mode of the display apparatus according to the present invention, that is, a schematic view exemplifying a use mode upon connecting a digital camera to the display apparatus to display an image.

Also, as shown in FIG. 1B, as another use mode, a digital camera 4 is connected to the USB connector 102 of the display apparatus 1 via a USB cable 5, and an image stored in the digital camera 4 is projected and displayed as an image 22 on the screen 2. The digital camera 4 has a liquid crystal panel screen 401, operation member 402, and operation button 403. The liquid crystal panel screen 401 displays a preview of an image and the like to be transferred to the display apparatus 1. The operation member 402 accepts a selection instruction of an image from the user. The operation button 403 is a button used to accept a transfer start instruction to the display apparatus 1 from the user. A projection display operation by the display apparatus 1 based on image data stored in the digital camera 4 is attained in such a manner that an image display instruction by an operation on the digital camera 4 side is output from the digital camera 4 to the display apparatus 1, and image data to be output is transmitted from the digital camera 4 to the display apparatus 1.

The user who uses the display apparatus 1 can appreciate an image captured by the digital camera 4 by projecting and displaying it onto the screen or can make a presentation for other users by projecting an image which is saved in the flash memory 3 and represents briefing paper.

Figure 2:
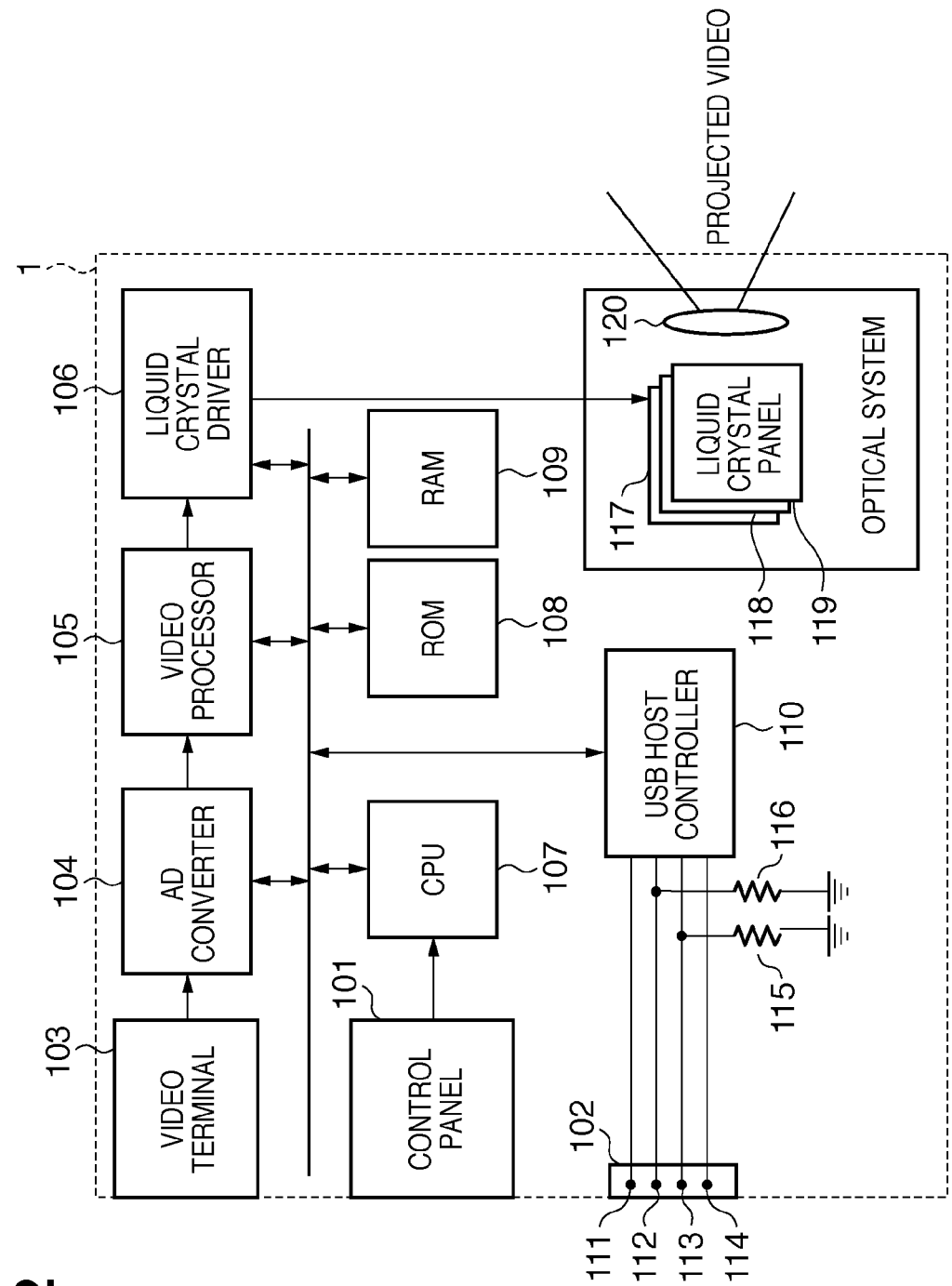
FIG. 2 is a block diagram illustrating the functional arrangement of the display apparatus.

Details of the display apparatus 1 will be described below with reference to FIG. 2. FIG. 2 is a block diagram illustrating the functional arrangement of the display apparatus 1. As shown in FIG. 2, a video signal is input to a video terminal 103 particularly via a video cable (not shown). The input video signal is converted into a digital video signal by an AD converter 104 (Analog-To-Digital) connected to the video terminal 103. A CPU 107 (to be described later) sets sampling parameters (a frequency, phase, etc.) upon AD conversion. Note that when an input video signal is a digital video signal, the AD converter 104 is not required, and the present invention is applicable when an appropriate receiver is used as needed.

The converted digital video signal is input to a video processor 105 connected to the AD converter 104. The video processor 105 applies video adjustment processing such as resolution conversion processing, contrast adjustment, and brightness, sharpness, and gamma corrections, and OSD image superimposing processing of a menu and the like. Note that "OSD" is an abbreviation for "On Screen Display".

The CPU 107 controls the operation of the video processor 105. Furthermore, the video processor 105 can receive arbitrary image data from the CPU 107. For example, when the CPU 107 transmits image data received by a USB host controller 110 to the video processor 105, the video processor 105 can output that video as a video signal.

The video signal output from the video processor 105 is input to a liquid crystal driver 106, and is converted into signals (e.g., RGB video signals) suited to drive liquid crystal panels 117, 118, and 119. The liquid crystal panels 117, 118, and 119, which respectively represent three primary colors, that is, Red, Green, and Blue, include liquid crystal pixels arranged in a matrix pattern, and form images based on input signals. The liquid crystal panels 117, 118, and 119 are arranged to transmit light emitted from a lamp (not shown) through them, and modulate light coming from the lamp by images formed based on the input signals.

Figure 11A:
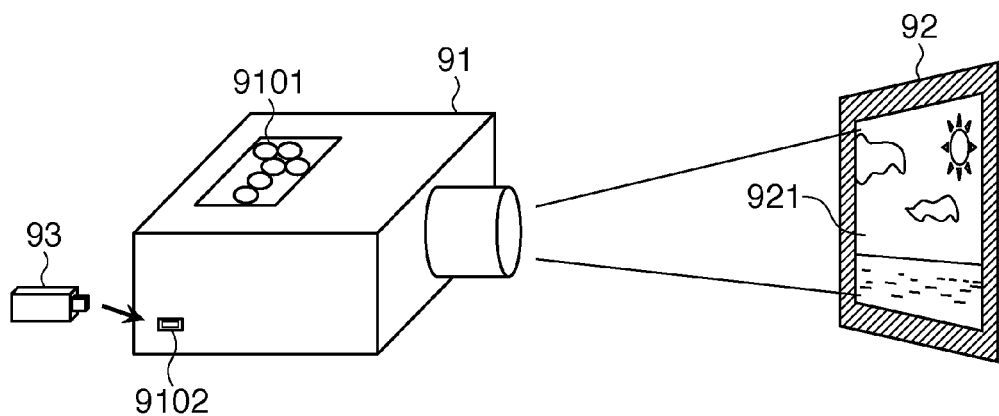
FIG. 11A is a schematic view showing an overview when a flash memory is connected to a conventional projector to display an image.
Figure 11B:
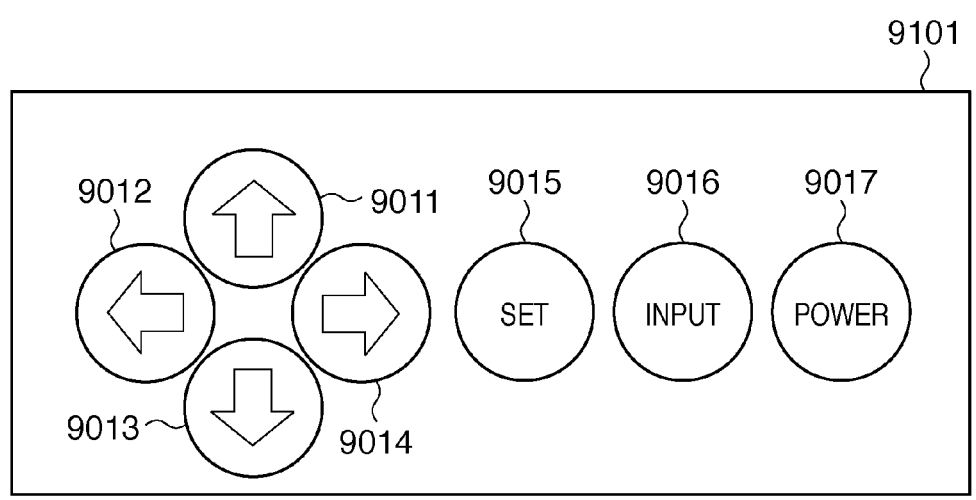
FIG. 11B is a schematic view showing details of a control panel.
Figure 12:
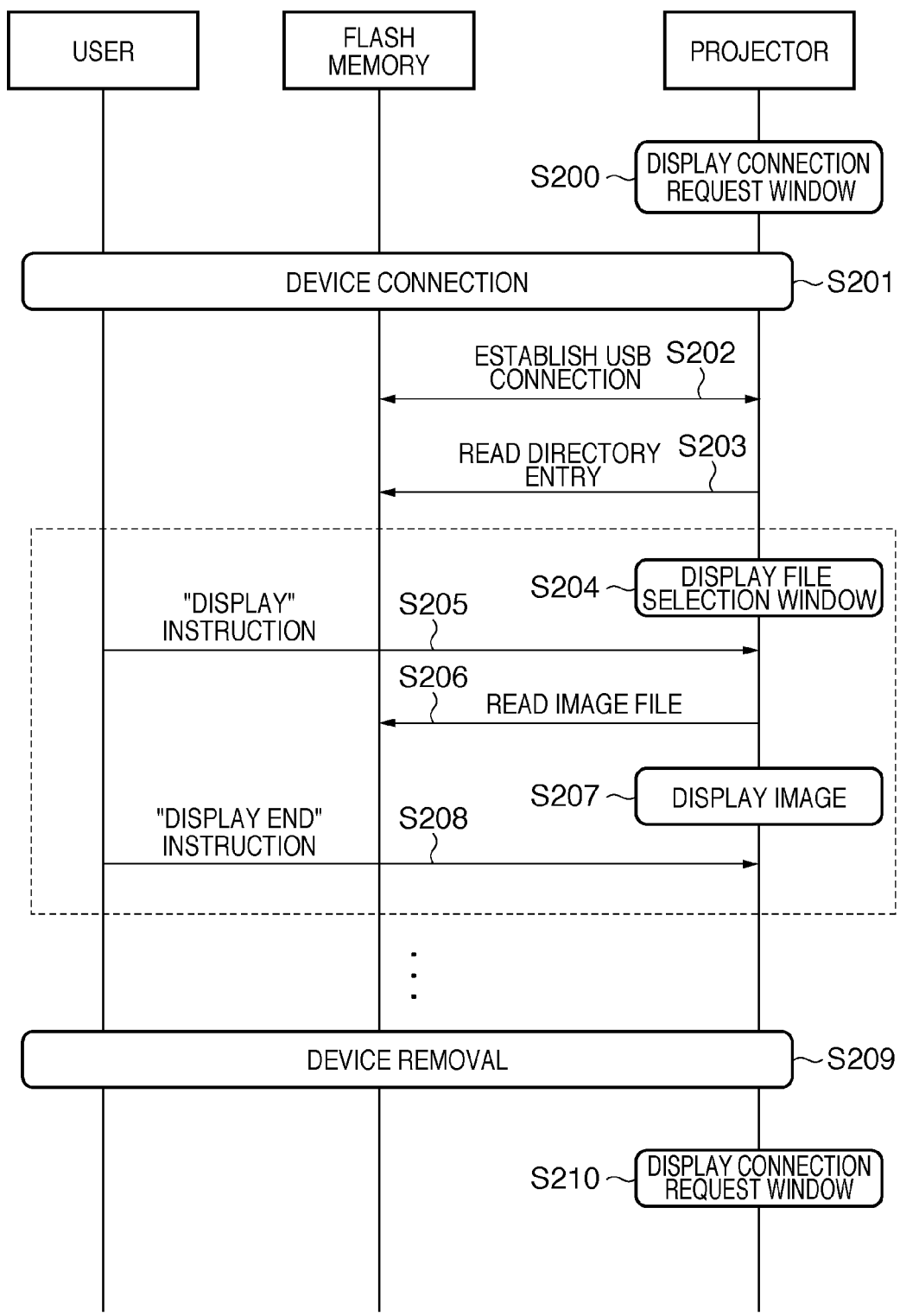
FIG. 12 is a sequence chart showing the operation sequence when the flash memory is connected to the projector to display an image.

A projection lens 120 projects and displays light modulated by the liquid crystal panels 117, 118, and 119 onto an external device (e.g., the screen 2). The control panel 101 has an up arrow button, left arrow button, down arrow button, right arrow button, enter button, input button, and power button as in the control panel 9101 that has been explained with reference to FIG. 11B. Pressing information of each button on the control panel 101 is sent to the CPU 107 as an operation instruction by the user. More specifically, that information is used to control a cursor movement, an enter operation, and the like of a menu on a display window.

The USB host controller 110 is a circuit which makes a USB communication with an external device using a VBUS line 111, D+ line 112, D− line 113, and GND line 114, which are specified in the USB standard. In the USB host controller 110, data to be transmitted/received is input/output by the CPU 107. The D+ line 112 and D− line 113 are USB communication lines used to make a differential communication, and are respectively pulled down by resistors 115 and 116. The VBUS line 111, D+ line 112, D− line 113, and GND line 114 are connectable to an external device via the USB connector 102 as a connection unit. The USB connector 102 serves as a USB interface which can connect a USB device as an external device. Therefore, the display apparatus 1 and USB device can communicate with each other via the USB connector 102.

The CPU 107 (Central Processing Unit) centrally controls the display apparatus 1. More specifically, the CPU 107 manages to start up and shut down the display apparatus 1, and controls the respective units such as the AD converter 104, video processor 105, USB host controller 110, and liquid crystal driver 106. A ROM 108 (Read Only Memory) stores program codes and various data required to operate the CPU 107. A CPU 107 (Random Access Memory) provides a work area required to let the RAM 109 operate.

The CPU 107 can select a video source to be displayed from the following two sources in addition to the startup processing of respective blocks after power-ON. The first video source is a video picture signal input from the video terminal 103. The second video source is image data transmitted from a device connected via the USB connector 102. The CPU 107 controls the video processor 105 to project an input selection menu window in response to a user's operation on the control panel 101 as a trigger. FIG. 3 is a schematic view exemplifying the input selection menu window. As shown in FIG. 3, the input selection menu window presents a selection menu of "external video" and "USB" as a video source to be displayed to the user.

After that, the CPU 107 receives a selection instruction input by a user's operation on the control panel 101, and executes a video source switching operation. In this video source switching operation, when "USB" is selected, and the projection display operation of image data from the flash memory 3 or digital camera 4 connected to the display apparatus 1 is to be executed, the CPU 107 sequentially executes the flowcharts including steps S801 to S832 exemplified in FIGS. 4A to 4C2. The processing of these flowcharts is executed until the power switch of the display apparatus 1 is turned off or until the input selection menu is displayed again, and "external video" is selected as a video source.

Figure 4A:
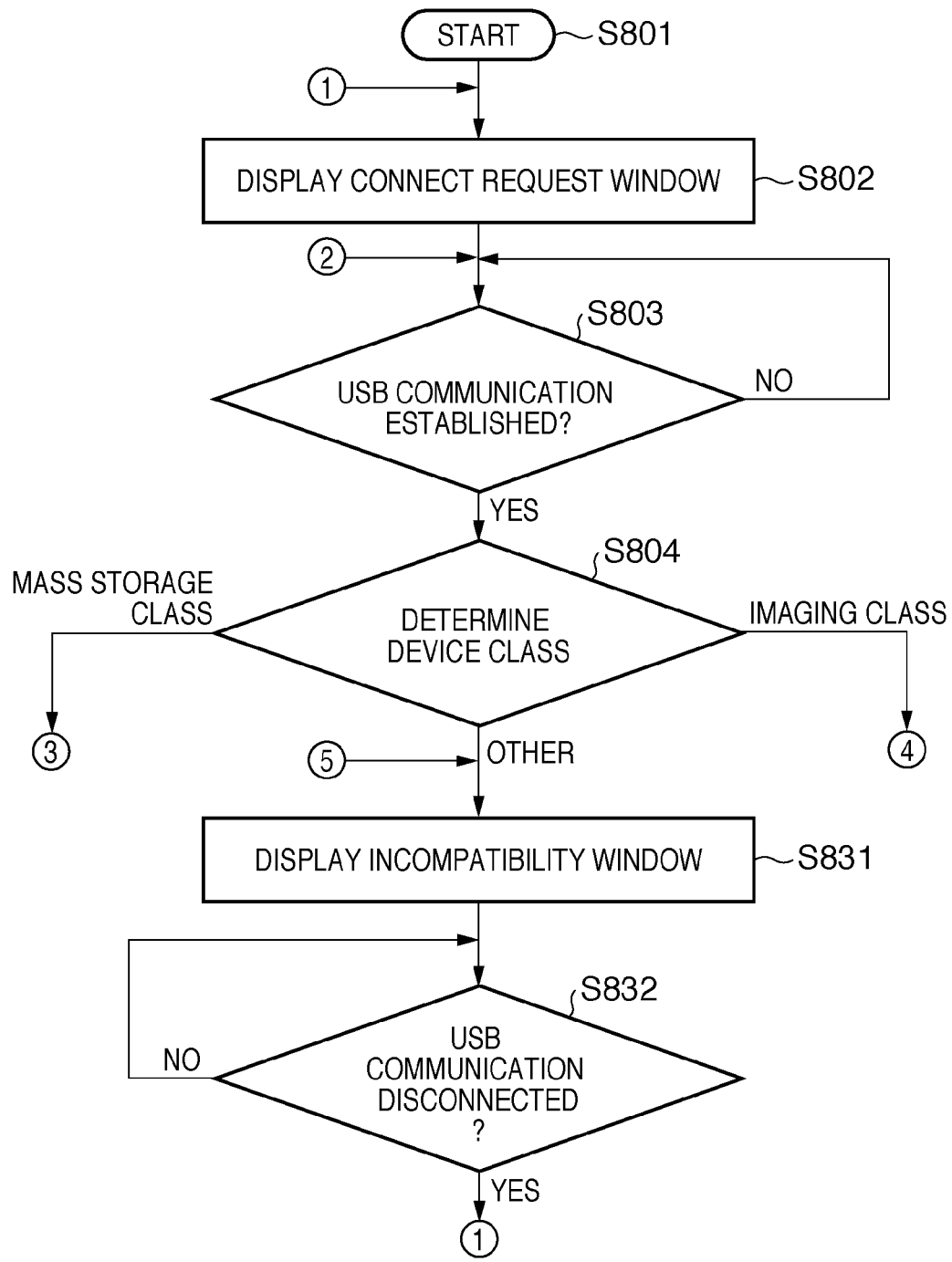
FIG. 4A is a flowchart showing the processing of the display apparatus.
Figures 1, 4B:
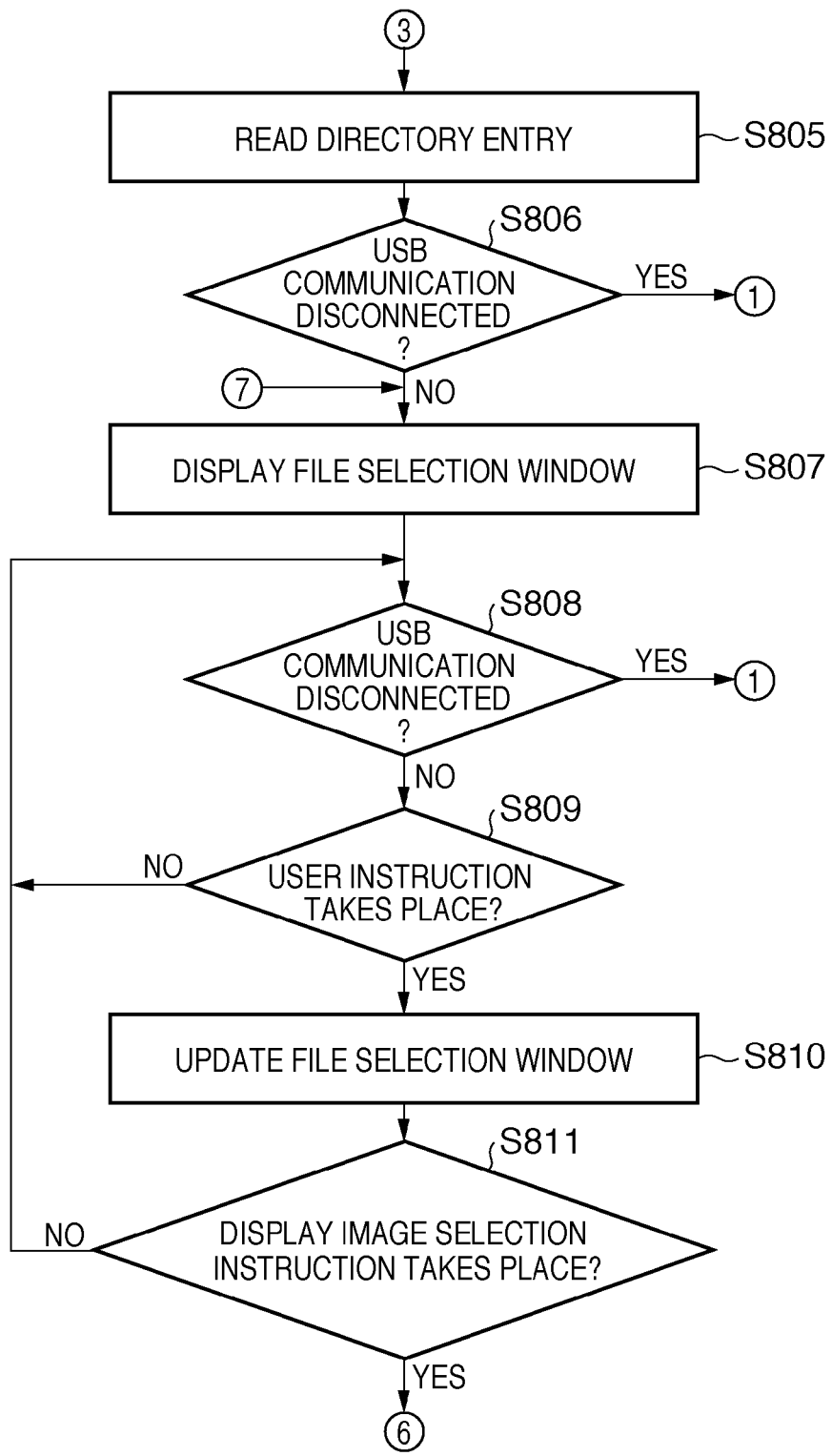
FIG. 4B1 is a flowchart showing the processing of the display apparatus when "Mass Storage Class" is determined in step S804 in FIG. 4A.
Figures 1, 4C:
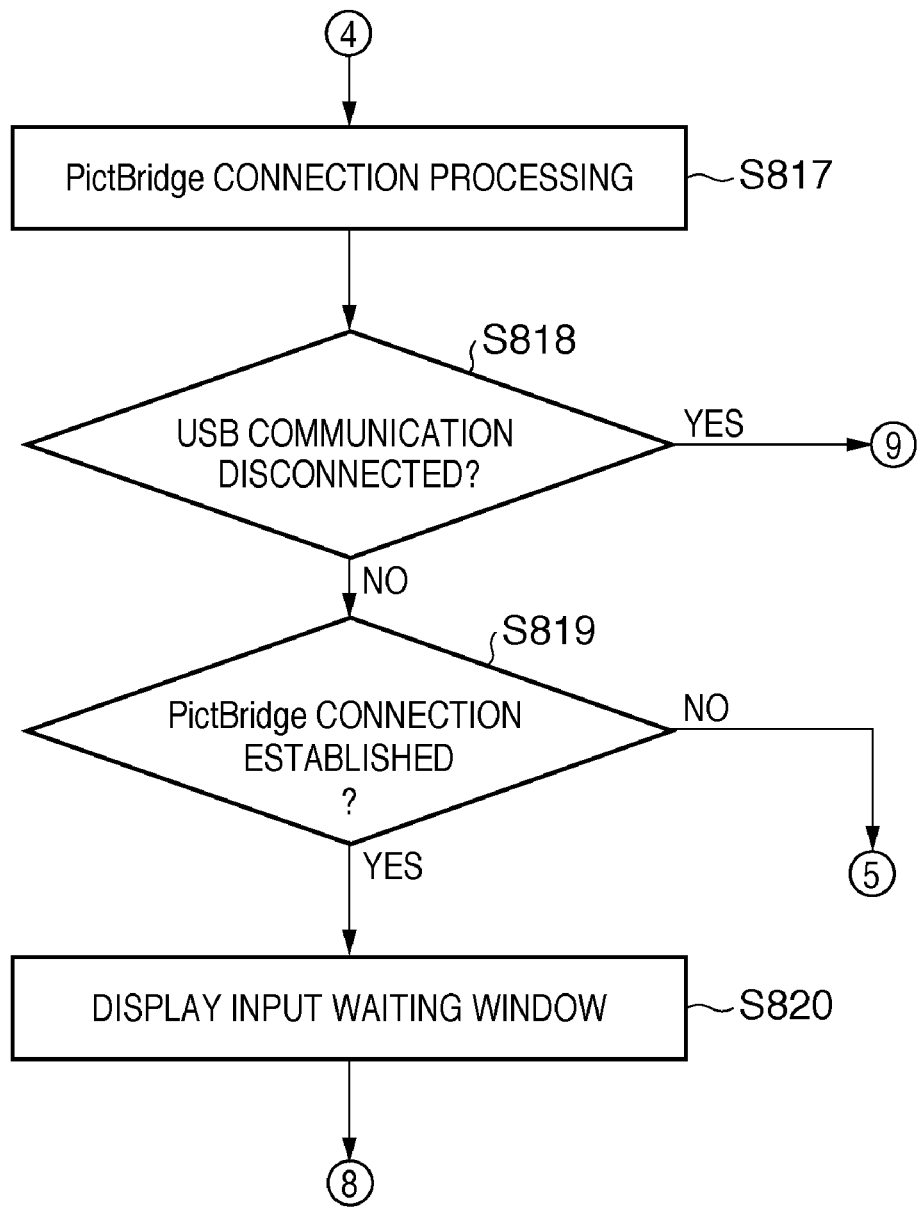
Figures 2, 4C:
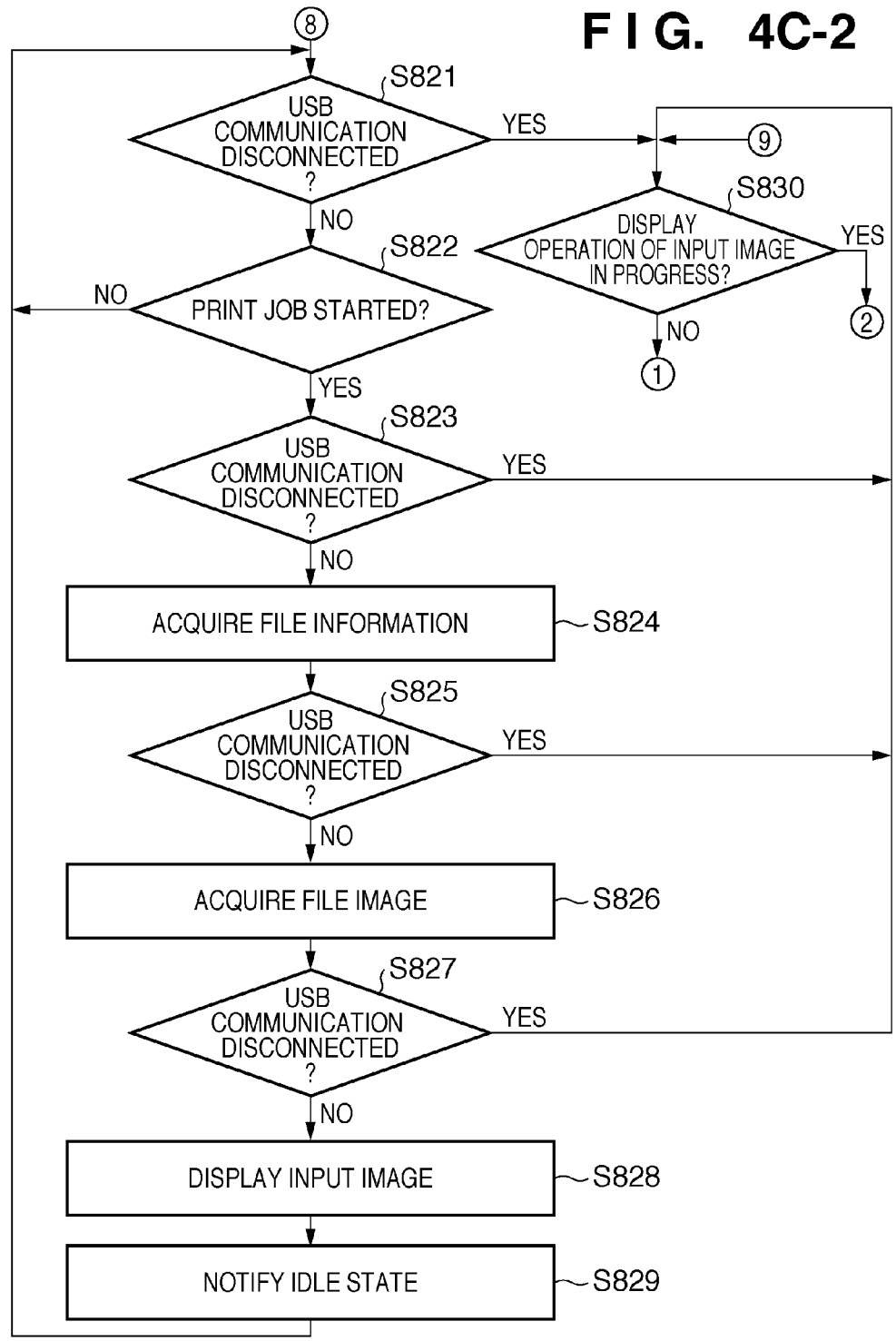
Figure 13A:
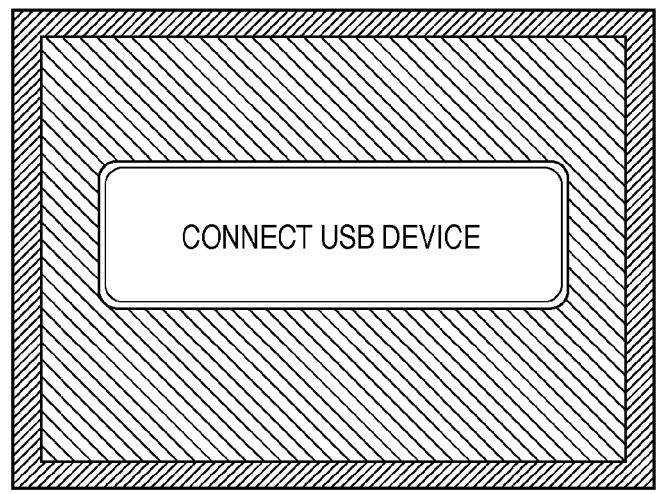
FIG. 13A is a schematic view exemplifying a connection request window projected by the projector onto a screen.

As shown in FIGS. 4A to 4C2, if the processing is started (S801), the CPU 107 controls the video processor 105 to project and display a USB device connection request window onto the screen 2 (S802). This connection request window is as has been described with reference to FIG. 13A, and prompts the user to connect a USB device. The connection request window is a kind of pattern image, and is displayed based on pattern image data stored in advance in the ROM 108.

The CPU 107 sends an inquiry to the USB host controller 110 to determine whether or not a USB device is communication-connected via the USB connector 102, and a USB communication is established (S803). If it is determined in step S803 that a USB communication is established, the process to be executed by the CPU 107 advances to the next step.

The CPU 107 sends an inquiry to the USB host controller 110 to determine a class of the communication-connected USB device (S804). This class is determined based on class information transmitted from the USB device when the USB host controller 110 establishes a USB communication with that USB device connected via the USB connector 102. More specifically, the class information of the USB device includes USB Mass Storage Class indicating the class of a device which is a simple storage and physically disconnects a communication connection. Also, the class information includes USB Imaging Class (often also called Imaging Device) indicating the class of a device which can execute communication control with the connected display apparatus 1 and can logically disconnect a communication connection depending on devices. Note that USB Mass Storage Class will be referred to as Mass Storage Class, and USB Imaging Class will be referred to as Imaging Class hereinafter. For example, the flash memory 3 transmits class information indicating Mass Storage Class to the display apparatus 1 at the time of connection, and the digital camera 4 transmits class information indicating Imaging Class to the display apparatus 1 at the time of connection. If the class information indicates Mass Storage Class in step S804, the process to be executed by the CPU 107 advances to step S805; if the class information indicates Imaging Class, the process advances to step S817; otherwise, the process advances to step S831.

FIG. 4A shows "Mass Storage Class" and "Imaging Class" as the device classes, but the present invention is not limited to these classes. For example, the display apparatus 1 may store a class for which an image display operation is to be continued and a class for which the operation is to be ended (or one of these classes) at the time of disconnection of a communication.

The CPU 107 executes a sequence of steps S805 to S816 when the communication-connected USB device is a USB mass storage such as the flash memory 3. In step S805, the CPU 107 reads out directory entry information stored in the USB device via the USB host controller 110.

In step S806, the CPU 107 sends an inquiry to the USB host controller 110 to determine whether or not a USB communication with the USB device was disconnected in the previous process (step S805 in this case). If it is determined in step S806 that the USB communication was disconnected, the process to be executed by the CPU 107 returns to step S802.

Figure 13B:
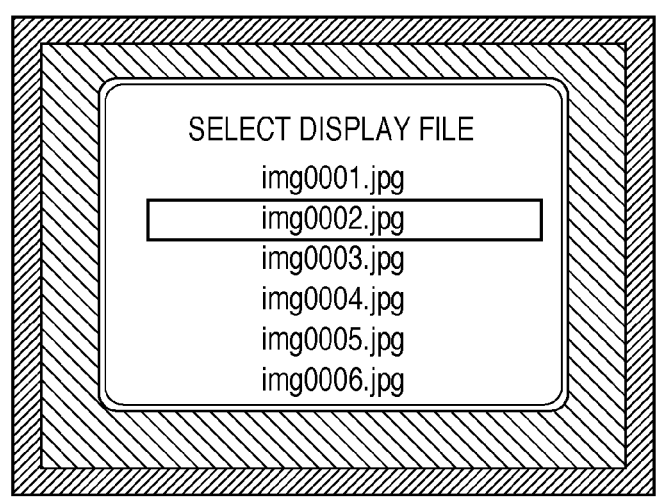
FIG. 13B is a schematic view exemplifying a file selection window projected by the projector onto the screen.

In step S807, the CPU 107 controls the video processor 105 to display a file selection window that enumerates image file names based on the readout directory entry information. This file selection window is as has been described with reference to FIG. 13B, and is a window that displays a file name list of image files stored in the flash memory 3 and a cursor used to select them. The display apparatus 1 prompts the user to select an image file to be displayed of those stored in the flash memory 3 using this file selection window.

The CPU 107 determines in step S808 whether or not a USB communication with the USB device was disconnected, as in step S806. The CPU 107 determines in step S809 whether or not the user has made an operation on the control panel 101. If it is determined in step S809 that the user has not made any operation, the process to be executed by the CPU 107 returns to step S808.

In step S810, the CPU 107 updates the file selection window based on the user's operation on the control panel 101. More specifically, when the user presses the up or down arrow button on the control panel 101, the CPU 107 reconfigures and displays a window on which the cursor to be rendered to select a file of interest has been moved.

The CPU 107 determines in step S811 based on a user's operation on the control panel 101 whether or not the user has made an operation to select an image file to be displayed. More specifically, when the user presses the enter button on the control panel 101, the CPU 107 determines that an image file in a cursor line is determined as that to be displayed. If no image file selection operation is made, the process to be executed by the CPU 107 returns to step S808.

In step S812, the CPU 107 reads out a file image of the image file selected in step S811 from the USB device via the USB host controller 110. The CPU 107 determines in step S813 whether or not a USB communication with the USB device was disconnected, as in step S806.

Figure 13C:
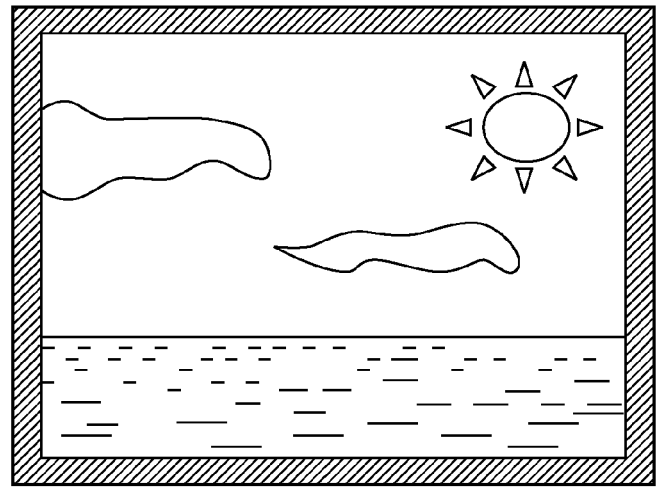
FIG. 13C is a schematic view exemplifying a display of image data which is stored in the flash memory, and is projected by the projector onto the screen.
Figure 14B:
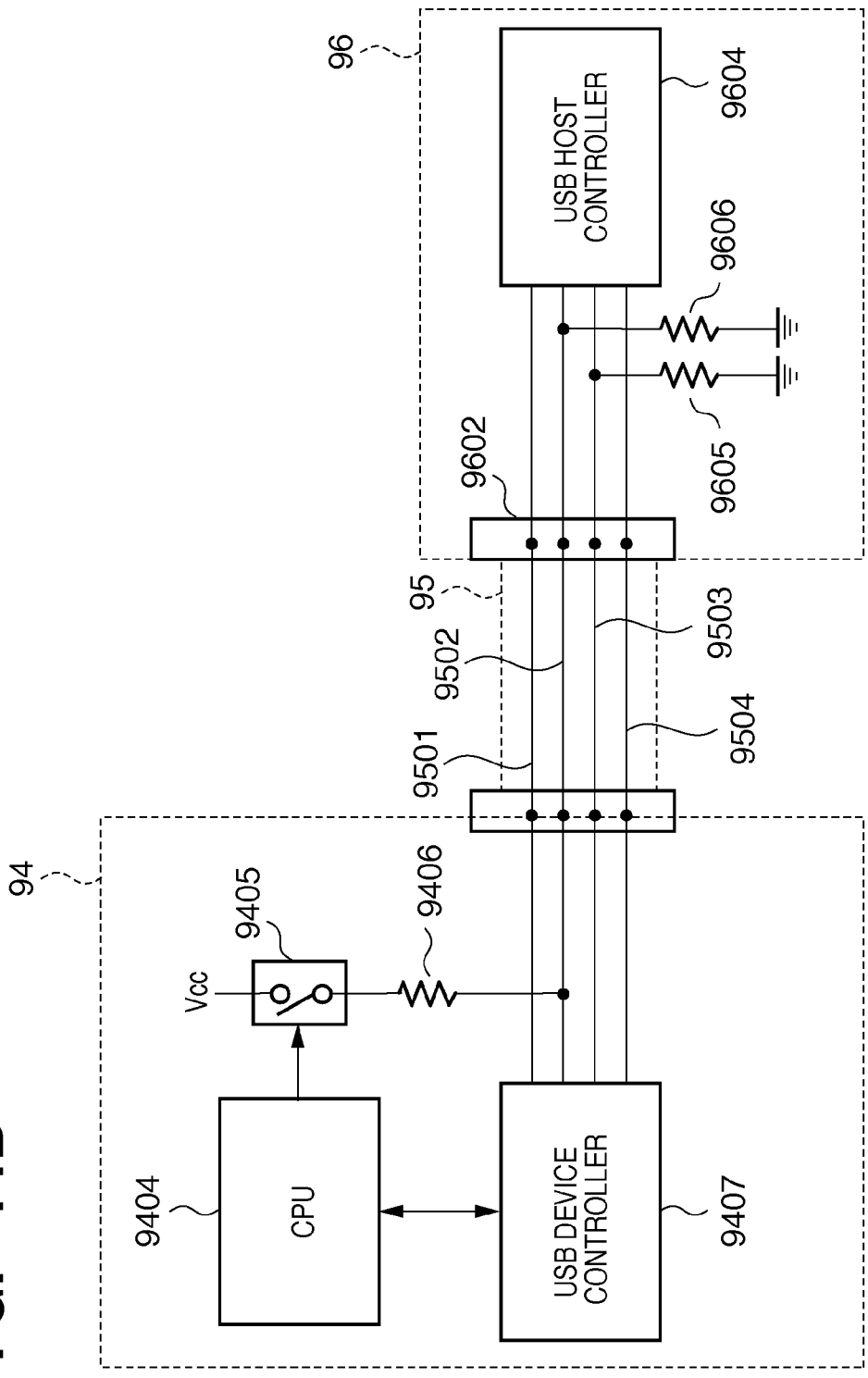
FIG. 14B is a block diagram showing the arrangement associated with a communication between the printer and digital camera.

In step S814, the CPU 107 controls the video processor 105 to project and display an image based on the readout file image on the screen 2, after the image is scaled to match the resolution of the liquid crystal panels 117, 118, and 119. The image which is projected and displayed on the screen 2 is the same as that which has been described with reference to FIG. 13C, and is based on image data stored in advance in the flash memory 3.

The CPU 107 determines in step S815 whether or not a USB communication with the USB device was disconnected, as in step S806. The CPU 107 determines in step S816 based on a user's operation on the control panel 101 whether or not the user gives the instruction to end the image display operation. More specifically, the CPU 107 makes this determination by acquiring pressing information of the enter button on the control panel 101. If the user does not give the instruction to end the image display operation, the process to be executed by the CPU 107 returns to step S815. If the user gives the instruction to end the image display operation, the process to be executed by the CPU 107 returns to step S807, and the file selection window is displayed again to prompt the user to select another image file.

Figure 15:
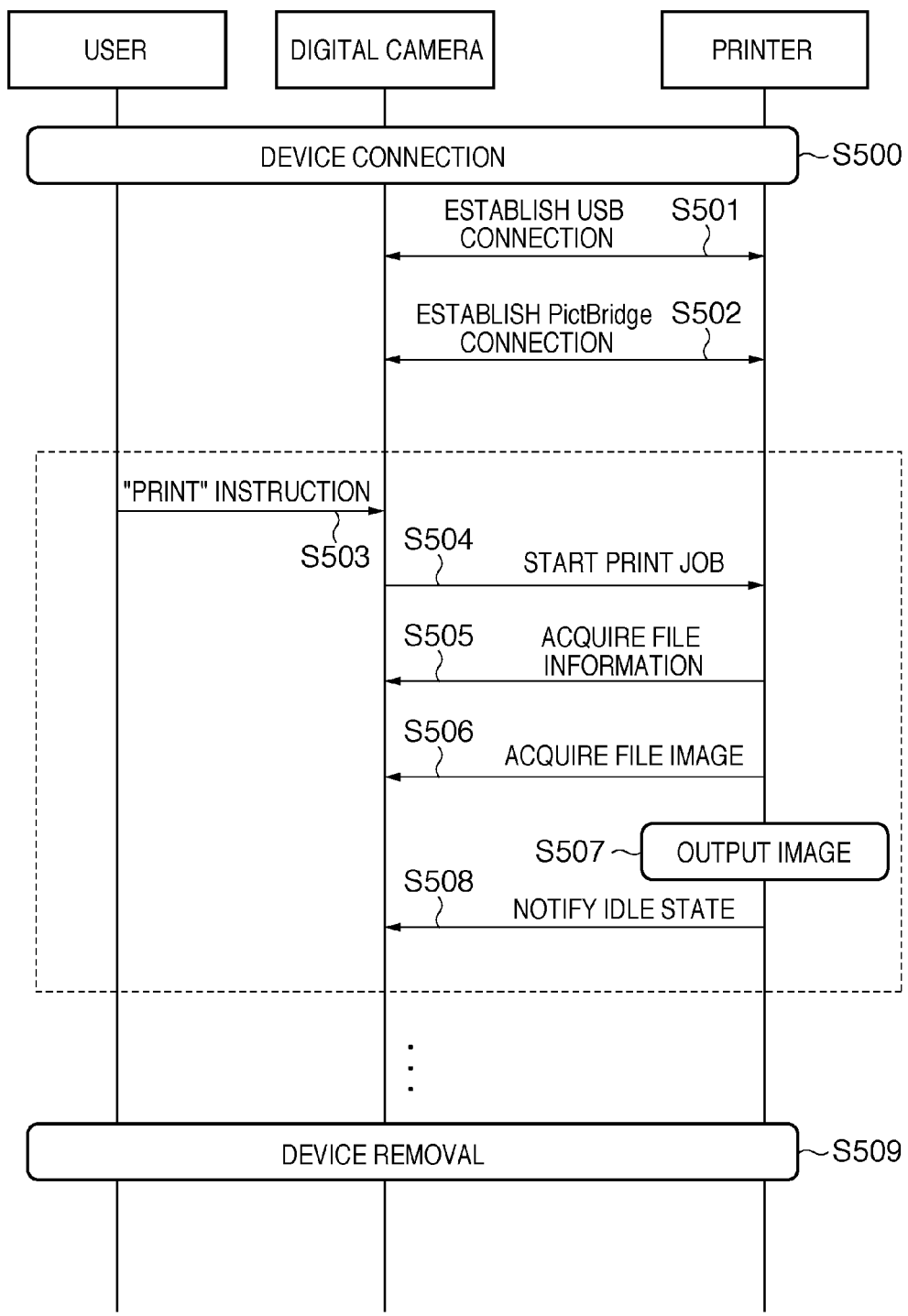
FIG. 15 is a sequence chart showing the operation sequence when the digital camera is connected to the printer to output an image.
Figure 16:
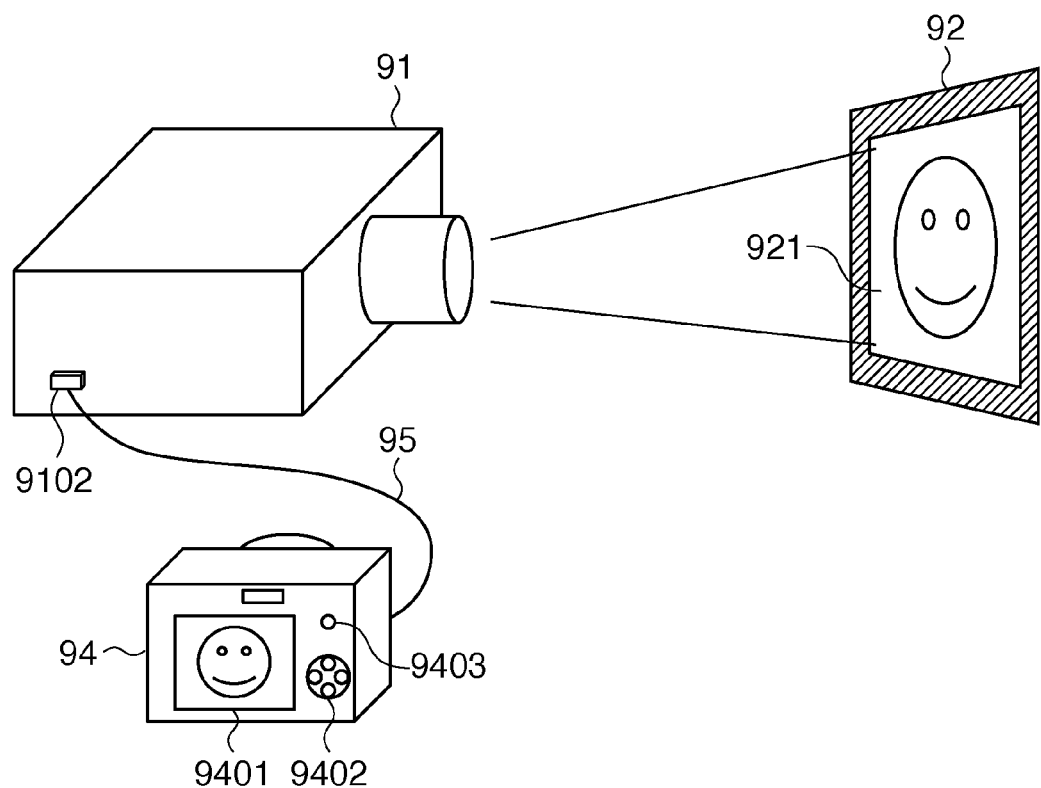
FIG. 16 is a schematic view showing an overview when a digital camera is connected to a projector to display an image.

On the other hand, the CPU 107 executes a sequence of steps S817 to S830 when the connected USB device corresponds to, for example, Imaging Class such as the digital camera 4 compatible to the PictBridge. Note that the Pict-Bridge-compatible digital camera 4 will be exemplified below, and a case will be described wherein the scheme of the PictBridge is diverted, and the projection display operation of the display apparatus 1 is made using a print instruction (image output) from the digital camera 4. In step S817, the CPU 107 executes PictBridge connection processing with respect to the USB device via the USB host controller 110. Note that this processing corresponds to step S502, which has been explained with reference to FIG. 15.

In step S818, the CPU 107 sends an inquiry to the USB host controller 110 to determine whether or not a USB communication with the USB device was disconnected in the previous process (step S817 in this case). If it is determined in step S818 that the USB communication was disconnected, the process to be executed by the CPU 107 advances to step S830.

The CPU 107 determines in step S819 whether or not the PictBridge connection processing in step S817 has succeeded, and a PictBridge connection is established. If a Pict-Bridge connection is not established because, for example, the USB device to be connected is incompatible to the Pict-Bridge, the process to be executed by the CPU 107 advances to step S831.

Figure 5A:
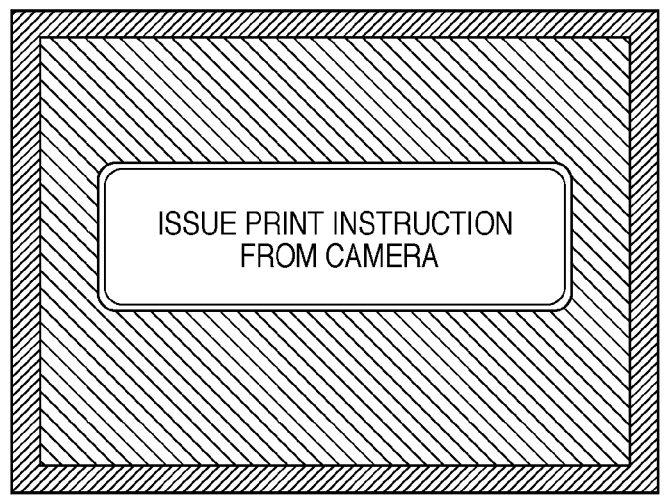
FIG. 5A is a schematic view showing an example of a projected display window, that is, a schematic view exemplifying an input waiting window.

In step S820, the CPU 107 controls the video processor 105 to project and display an input waiting window. This input waiting window is a window used to prompt the user to print an image file (or to transfer an image to a projector) by the PictBridge function from the digital camera side, as shown in FIG. 5A. Note that this step S820 corresponds to an idle state in which the control waits for a "print" instruction in step S503 described with reference to FIG. 15.

The CPU 107 determines in step S821 whether or not a USB communication with the USB device was disconnected, as in step S818. The CPU 107 determines in step S822 whether or not a print job start communication is made from the USB device via the USB host controller 110. This communication corresponds to step S504 which has been explained with reference to FIG. 15. If it is determined in step S822 that no start instruction is issued, the process to be executed by the CPU 107 returns to step S821.

The CPU 107 determines in step S823 whether or not a USB communication with the USB device was disconnected, as in step S818. In step S824, the CPU 107 acquires information of an image file to be output included in the print job from the USB device via the USB host controller 110. This step S824 corresponds to step S505 which has been described with reference to FIG. 15.

The CPU 107 determines in step S825 whether or not a USB communication with the USB device was disconnected, as in step S818. In step S826, the CPU 107 acquires an image of the image file included in the print job from the USB device via the USB host controller 110. This step S826 corresponds to step S506 which has been described with reference to FIG. 15.

Figure 5B:
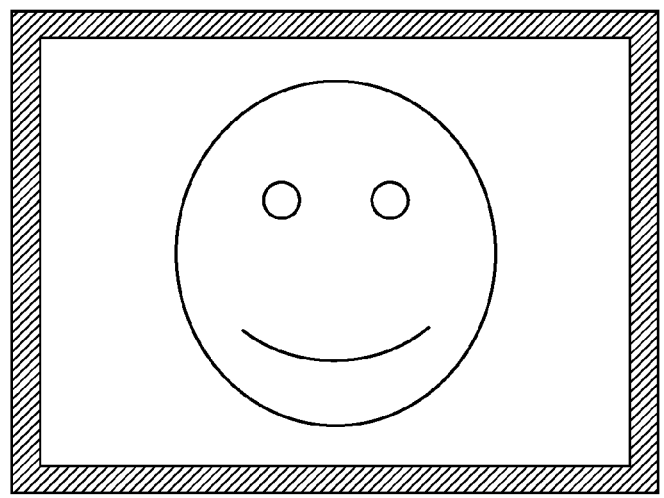
FIG. 5B is a schematic view showing an example of a projected display window, that is, a schematic view exemplifying a display of image data from the digital camera.

The CPU 107 determines in step S827 whether or not a USB communication with the USB device was disconnected, as in step S818. In step S828, the CPU 107 controls the video processor 105 to project and display the acquired image on the screen 2, after the image is scaled to match the resolution of the liquid crystal panels 117, 118, and 119. The image, which is projected and displayed on the screen 2, is an image based on image data captured by the digital camera, and is an image of a person or the like, as shown in, for example, FIG. 5B.

In step S829, the CPU 107 notifies the USB device, via the USB host controller 110, that a communication state based on the PictBridge connection transits to an idle state. This notification in step S829 corresponds to step S508 which has been described with reference to FIG. 15.

If it is determined in step S818, S821, S823, S825, or S827 that the USB communication was disconnected, the process of the CPU 107 advances to step S830. The CPU 107 determines in step S830 whether or not the projection display operation of an image based on the image acquired from the USB device is in progress (i.e., whether or not the process has passed step S828). If the projection display operation of the image is in progress, the process of the CPU 107 returns to step S803; otherwise, the process of the CPU 107 returns to step S802.

Figure 5C:
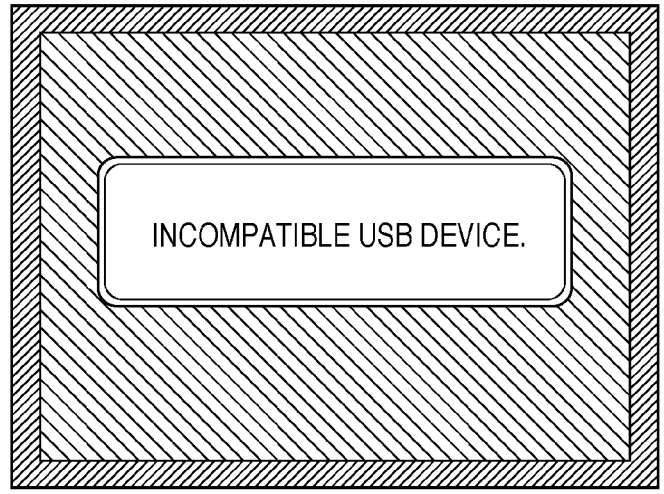
FIG. 5C is a schematic view showing an example of a projected display window, that is, a schematic view exemplifying an incompatibility window.

On the other hand, if an incompatible device class is determined in step S804, or if it is determined in step S819 that a PictBridge connection is not established, the process of the CPU 107 advances to step S831. In step S831, the CPU 107 controls to project and display an incompatibility window. This incompatibility window is a window used to notify the user that the connected USB device is incompatible to the display apparatus 1, as shown in FIG. 5C.

In step S832, the CPU 107 sends an inquiry to the USB host controller 110 to determine whether or not a USB communication with the USB device was disconnected. This determination in step S832 continues until the USB communication is disconnected, and if the USB communication is disconnected, the process of the CPU 107 returns to step S802.

As described above, when a USB communication is disconnected while the display apparatus 1 is connected to a USB device such as a flash memory device, and executes the projection display operation of image data stored in that device, the display apparatus 1 overwrites an image whose projection display operation is in progress by the connection request window (S802). When the class of the connected device corresponds to, for example, the flash memory device, the USB connection is disconnected mainly by removal of the device by the user. Furthermore, the user removes the device with the intention to end the projection display operation. Hence, when the USB connection is disconnected, it is preferable for the display apparatus 1 to overwrite an image, whose projection display operation is in progress, by the connection request window without continuing the projection display operation.

On the other hand, when a USB connection is disconnected while the display apparatus 1 is connected to a USB device such as a digital camera, and executes the projection display operation of image data stored in that device, the display apparatus 1 continues to display the image, whose projection display operation is in progress, without being overwritten by the connection request window (transition from step S830 to step S803). When the class of the connected device corresponds to, for example, the digital camera, the USB communication may be disconnected either by removal of the device by the user or by control on the USB device side. Therefore, since the USB connection is disconnected by not only removal of the device by the user who intended to end the projection display operation, it is preferable for the display apparatus 1 to continue to display an image, whose projection display operation is in progress, when the USB connection is disconnected.

That is, when a communication is disconnected while the display apparatus 1 executes the projection display operation based on image data from the connected device, the display apparatus 1 controls whether or not to continue the display operation of the image whose projection display operation is in progress according to the class of the connected device. Therefore, the display apparatus 1 can eliminate the opportunity of a display state which is likely to occur depending on the class of the connected device and is not intended by the user. For example, the display apparatus 1 can eliminate occurrence of situations that the image display operation is unwantedly ended in a case in which the user intends to browse images and that the image display operation is unwantedly continued in a case in which the user intends to end image browsing. Note that, in this embodiment, the image of the connection request window is used as an overwrite image. Alternatively, for example, a solid black or blueback pattern image may be used.

[First Modification]

As the first modification of the aforementioned embodiment, a case will be described wherein the processes of FIGS. 4C1 and 4C2 of those to be executed by the CPU 107 of the display apparatus 1 exemplified in FIGS. 4A to 4C2 are modified like the flowcharts shown in FIGS. 6A and 6B. Note that the same step numbers denote the same processes, and a repetitive description thereof will be avoided.

Figure 6A:
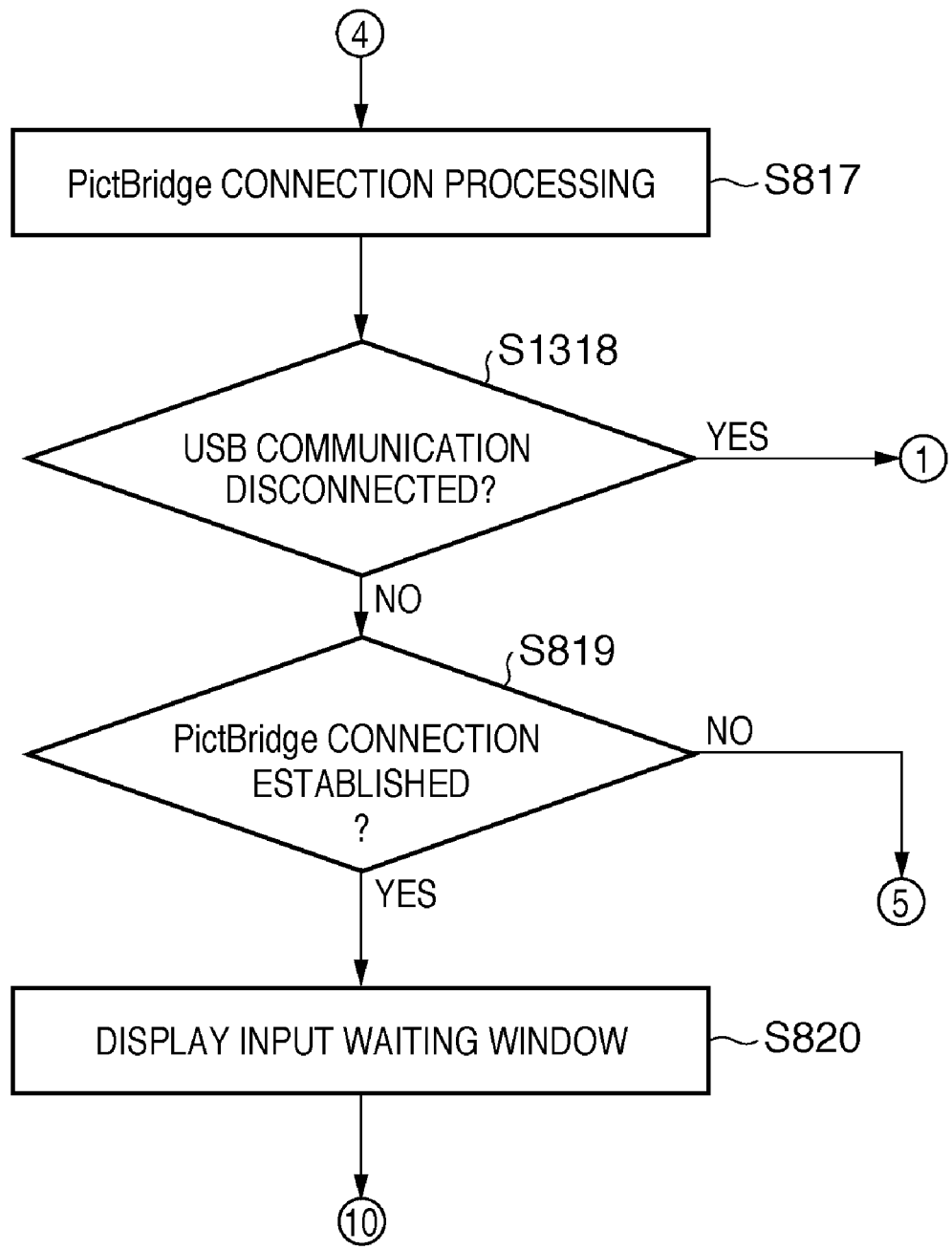
FIG. 6A is a flowchart showing processing of the first modification (corresponding to FIG. 4C1) in the display apparatus.
Figure 6B:
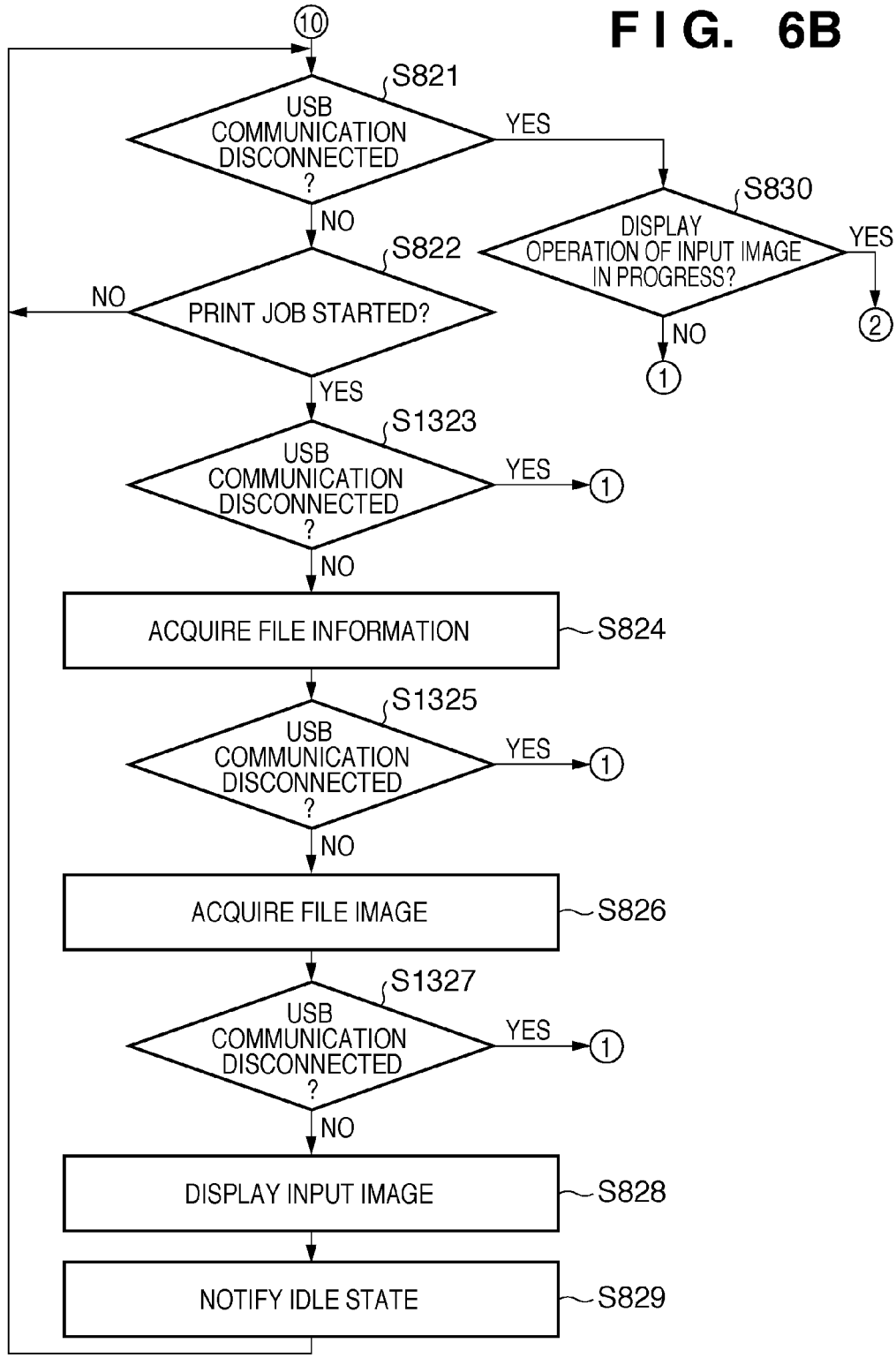
FIG. 6B is a flowchart showing processing of the first modification (corresponding to FIG. 4C2) in the display apparatus.

As shown in FIGS. 6A and 6B, in the first modification, steps S818, S823, S825, and S827 in the sequence of the CPU 107 exemplified in FIGS. 4C1 and 4C2 are respectively replaced by steps S1318, S1323, S1325, and S1327.

In step S1318, the CPU 107 sends an inquiry to the USB host controller 110 to determine whether or not a USB communication with the USB device was disconnected in the previous process (step S817 in this case). If it is determined in step S1318 that the USB communication was disconnected, the process to be executed by the CPU 107 returns to step S802. Note that the processing contents in steps S1323, S1325, and S1327 are the same as in step S1318.

In step S821, the CPU 107 sends an inquiry to the USB host controller 110 to determine whether or not a USB communication with the USB device was disconnected in the previous process (step S820 in this case). If it is determined in step S821 that the USB communication was disconnected, the process to be executed by the CPU 107 advances to step S830. That is, when the USB communication is disconnected at the display timing of the input waiting window, and in an idle state of the communication, since the process of the CPU 107 temporarily advances to step S830, an image can be prevented from being immediately overwritten by the connection request window.

As described above, in the first modification, the following processes of the display apparatus 1 executed when a communication is disconnected while the display apparatus 1 is connected to the PictBridge-compatible device and executes the projection display operation of an image stored in that device are different from the aforementioned embodiment. When the PictBridge connection is not in an idle state, that is, a communication is underway at the time of the aforementioned communication disconnection, the display apparatus 1 overwrites an image whose projection display operation is in progress by the connection request window. When the PictBridge connection is in an idle state, that is, a communication is not underway, an image whose projection display operation is in progress is continuously displayed.

When the PictBridge connection is in a non-idle state, that is, a communication is underway, a USB communication is more likely to be disconnected at that time not by control on the USB device side but by, for example, removal of the USB device by the user. Therefore, when a communication is disconnected during the USB communication, it is preferable for the display apparatus 1 to overwrite an image, whose projection display operation is in progress, by the connection request window without continuously displaying the image. When a communication is disconnected while the USB communication is in an idle state, such disconnection may be caused either by removal of the USB device by the user or by control on the USB device side. Therefore, since a USB communication in an idle state is disconnected by not only removal of the device by the user who intends to end the projection display operation, it is preferable for the display apparatus 1 to continue to display an image whose projection display operation is in progress.

[Second Modification]

Figure 7:
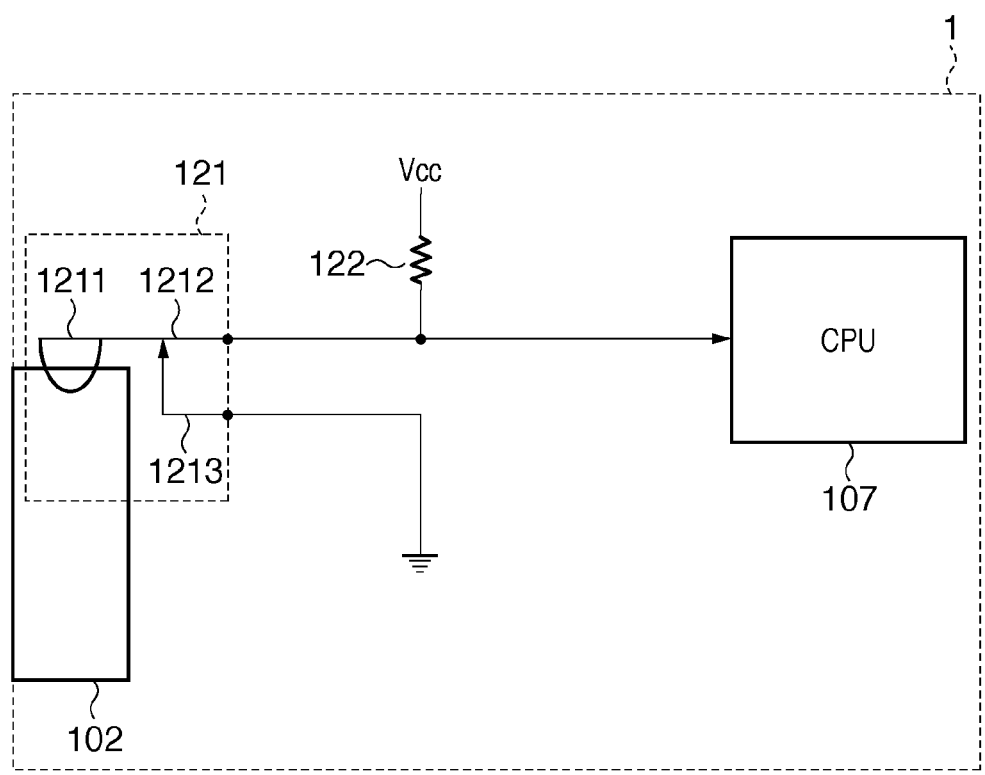
FIG. 7 is a block diagram showing the peripheral arrangement of a CPU and USB connector 102 of the second modification in the display apparatus.
Figure 8A:
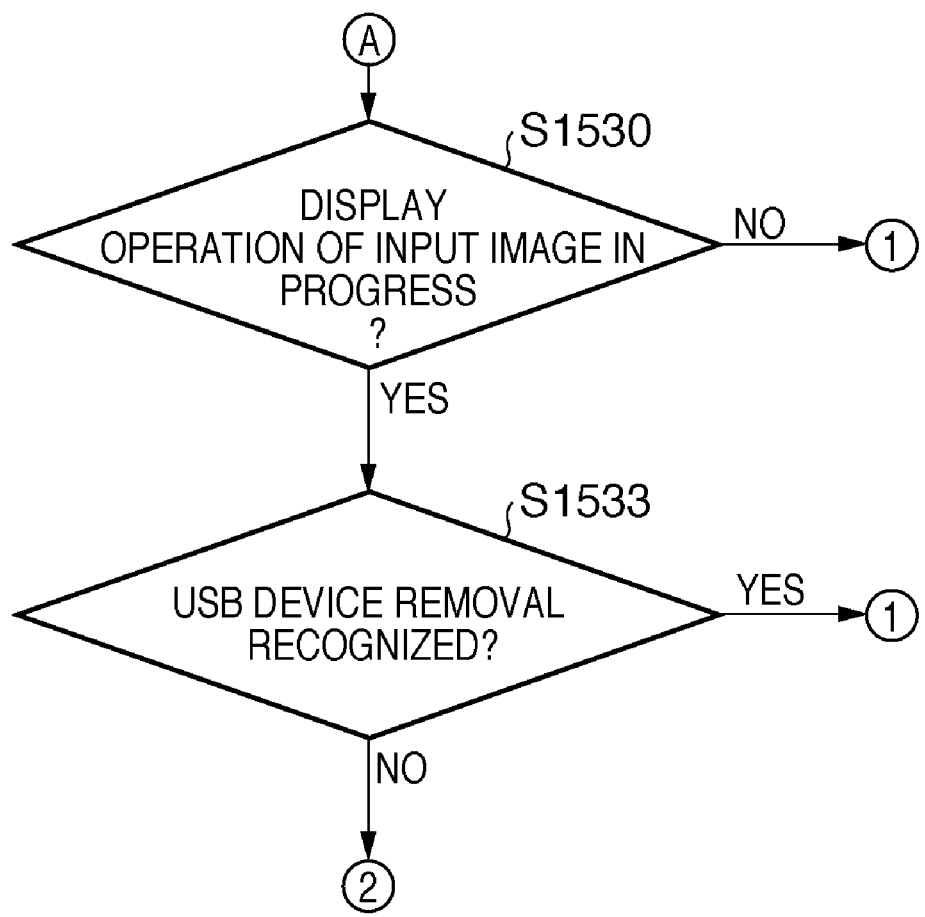
FIG. 8A is a flowchart showing processing of the second modification (continued from any of FIGS. 8B1 to 8C2) in the display apparatus.
Figures 1, 8B:
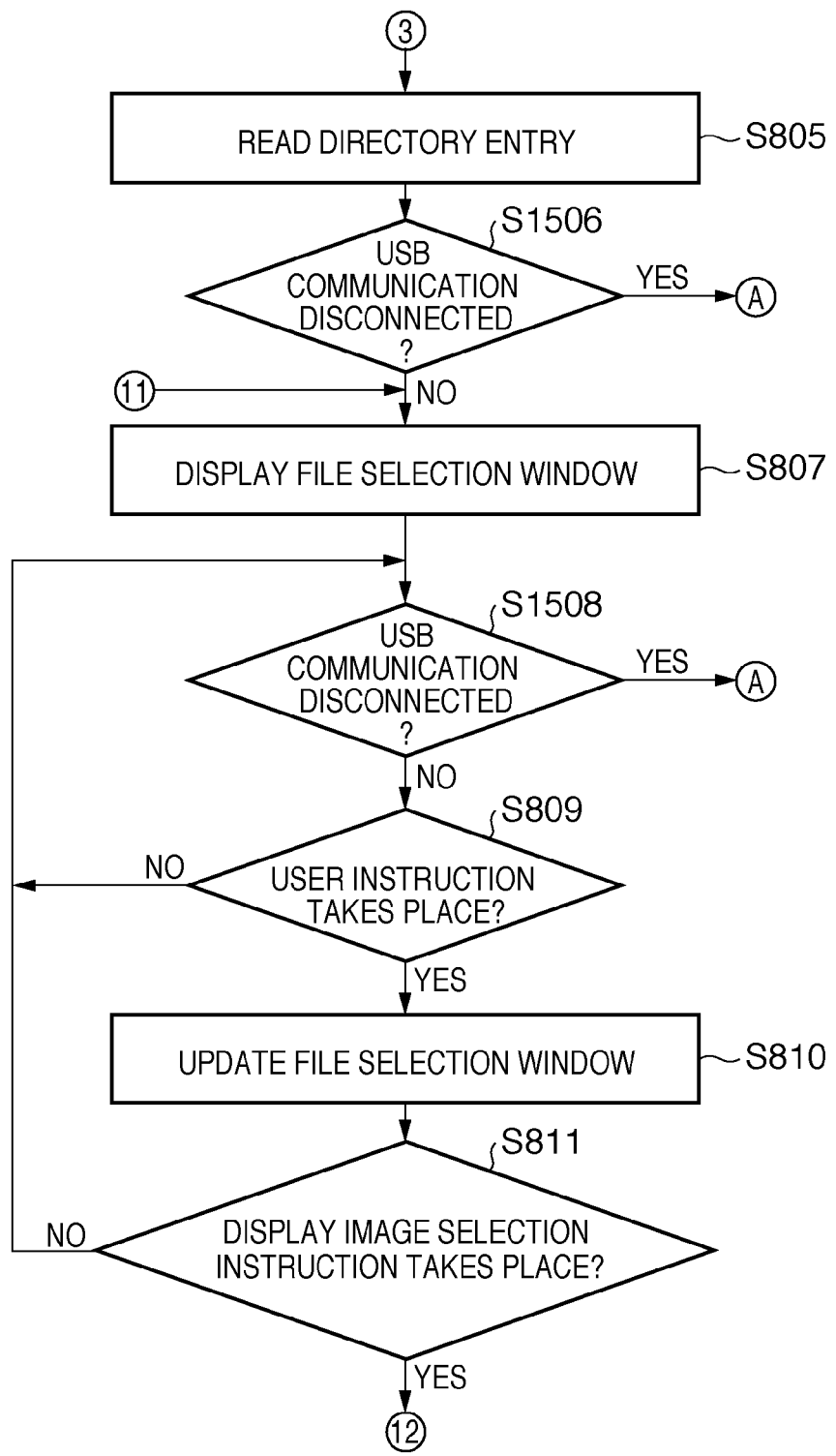
Figures 2, 8B:
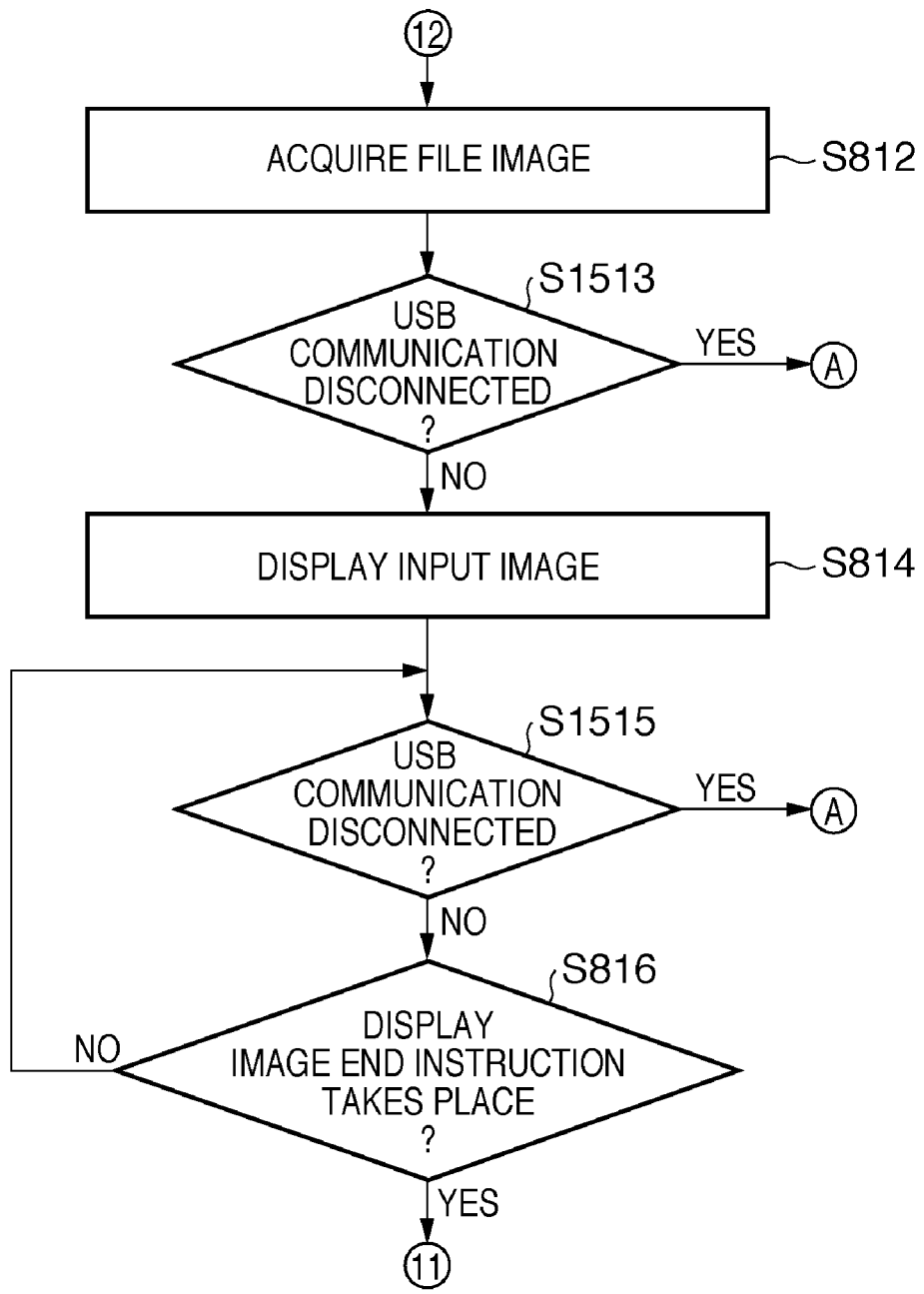
Figures 1, 8C:
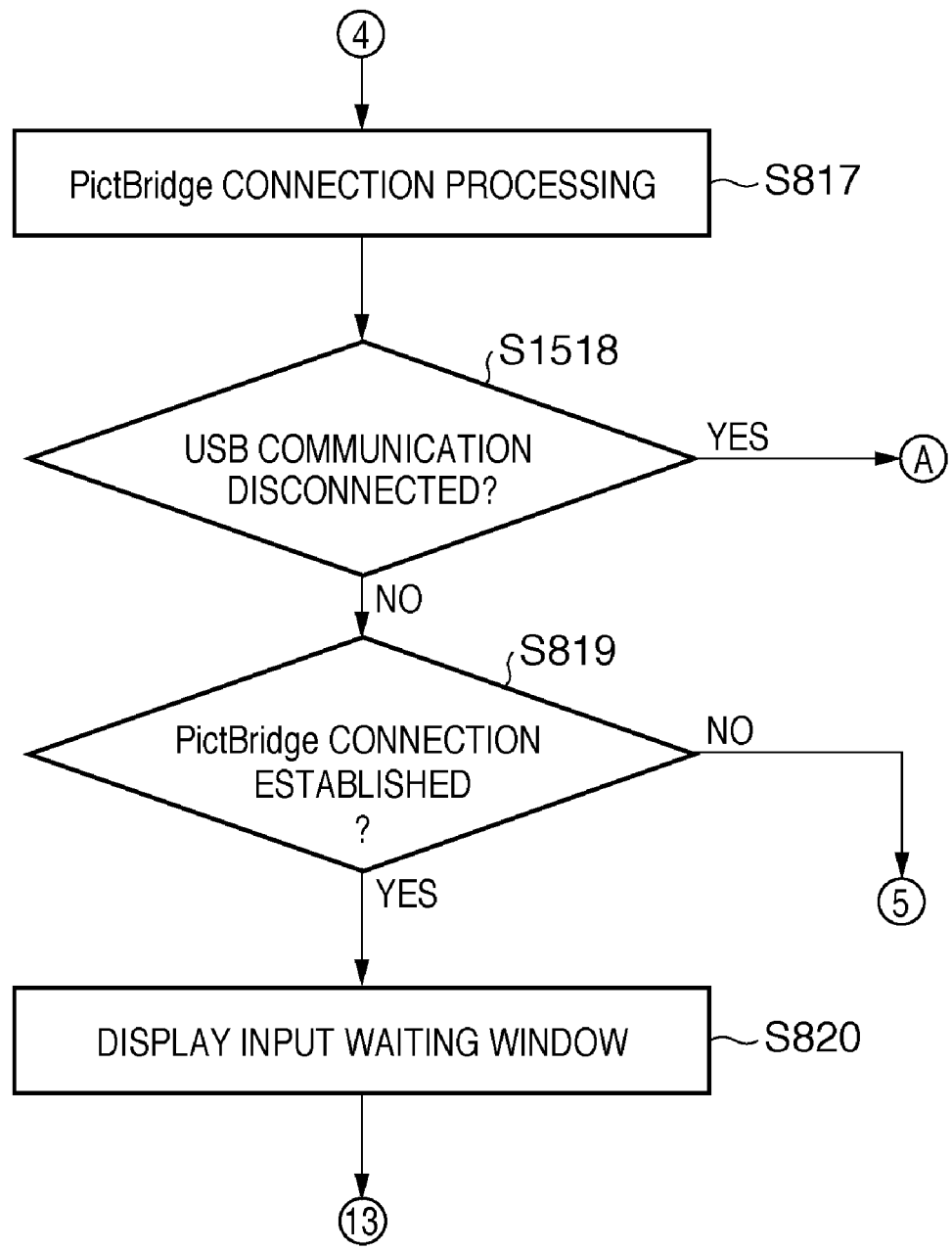
Figures 2, 8C:
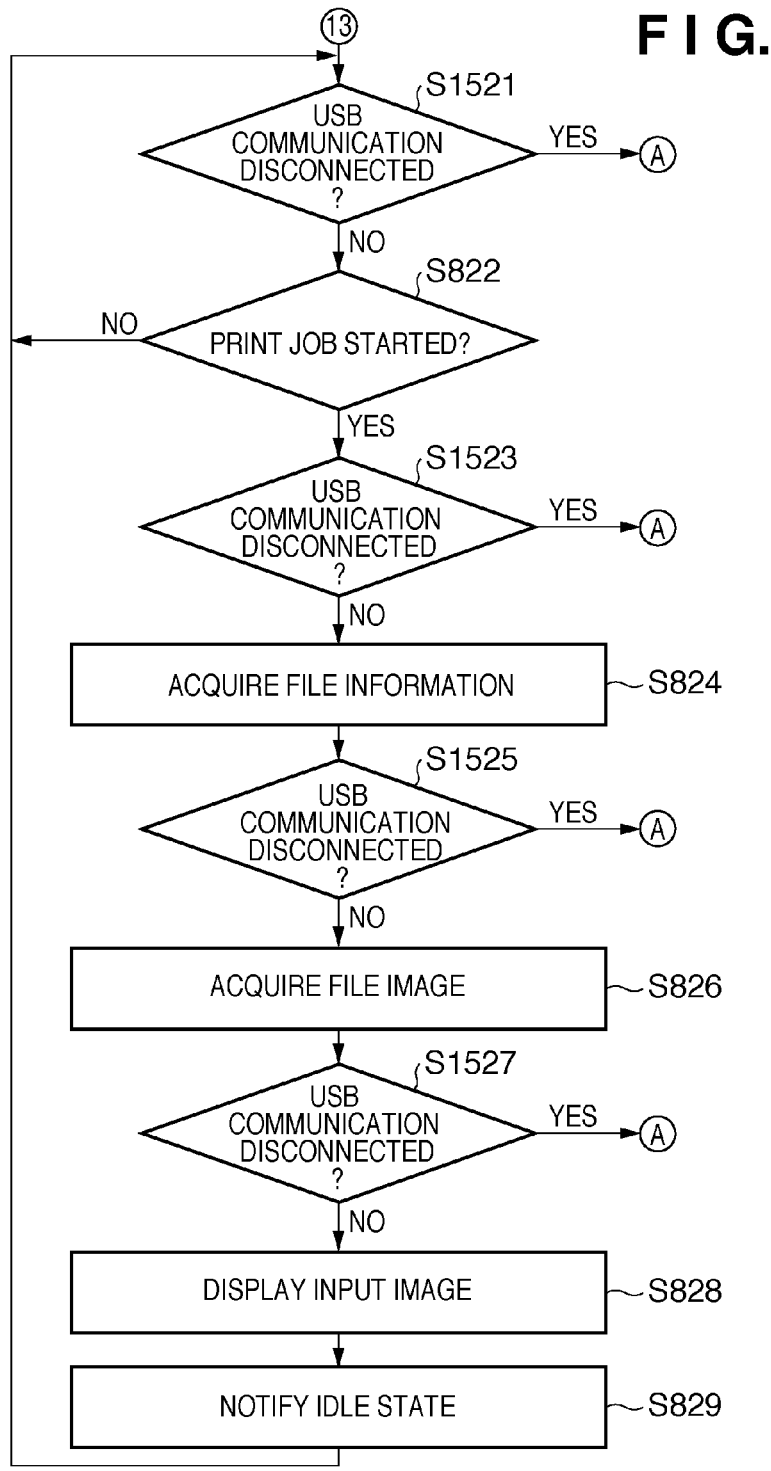

The second modification of the aforementioned embodiment will be described below. In the second modification, the peripheral arrangement of the CPU 107 and USB connector 102 of the display apparatus 1 exemplified in FIG. 2 is modified, as shown in FIG. 7. Also, in the second modification, the processes to be executed by the CPU 107 of the display apparatus 1 exemplified in FIGS. 4B1 to 4C2 are modified, as shown in the flowcharts shown in FIGS. 8A to 8C2. Note that the same reference numerals denote the same components, and a repetitive description thereof will be avoided.

As shown in FIG. 7, the display apparatus 1 includes an insertion detector 121 which detects insertion of a USB plug in the USB connector 102. In the insertion detector 121, a conductive terminal 1212 having a projection 1211, which is arranged at a position where the projection 1211 physically interferes with a USB plug, and a grounded conductive terminal 1213 to be arranged in the USB connector 102 to be brought into contact with each other when a USB plug is not inserted. The conductive terminal 1212 is pulled up by a resistor 122, and is connected to an input port of the CPU 107.

Therefore, in the insertion detector 121, when a USB plug is inserted into the USB connector 102, the USB plug pushes up the conductive terminal 1212, and the conductive terminals 1212 and 1213 are open. Hence, the CPU 107 can recognize insertion/removal of the USB plug to/from the USB connector 102.

In the second modification, steps S806, S808, S813, S815, S818, S821, S823, S825, and S827 shown in FIGS. 4B1 to 4C2 are changed, as shown in FIGS. 8B1 to 8C2, and FIG. 8A having steps S1530 and S1533 is added.

In step S1506, the CPU 107 sends an inquiry to the USB host controller 110 to determine whether or not a USB communication with the USB device was disconnected in the previous process (step S805 in this case). If it is determined in step S1506 that the USB communication was disconnected, the process to be executed by the CPU 107 advances to step S1530. Note that the processing contents in steps S1508, S1513, S1515, S1518, S1521, S1523, S1525, and S1527 are the same as in step S1506.

The CPU 107 determines in step S1530 whether or not the projection display operation of an image based on image data acquired from the USB device is in progress (that is, whether or not the process has passed step S814 or S828). If the projection display operation of the image is in progress, the process of the CPU 107 advances to step S1533; otherwise, the process of the CPU 107 returns to step S802.

The CPU 107 determines in step S1533 using the insertion detector 121 whether or not a USB plug is physically removed from the USB connector 102. If it is determined in step S1533 that the USB plug is physically removed, the process of the CPU 107 returns to step S802. On the other hand, if it is determined that the USB plug is not physically removed, the process of the CPU 107 returns to step S803.

As described above, in the second modification, when the USB plug is physically removed and a USB communication is disconnected during the projection display operation of image data stored in the connected USB device, the display apparatus 1 overwrites the image whose projection display operation is in progress by the connection request window. Note that when a USB communication is disconnected not by physical removal of the USB plug, the display apparatus 1 does not overwrite the image whose projection display operation is in progress by the connection request window. Thus, the display apparatus 1 can eliminate occurrence of situations that the image display operation is unwantedly ended in a case in which the user intends to browse images and that the image display operation is unwantedly continued in a case in which the user intends to end image browsing.

[Third Modification]

Figure 9A:
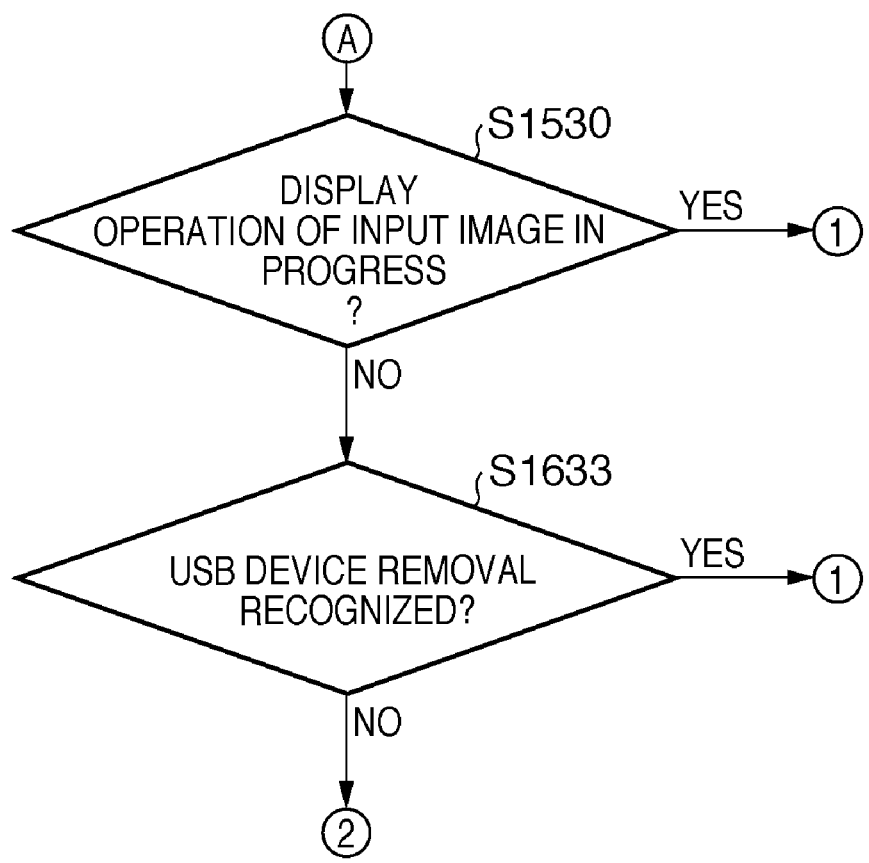
FIG. 9A is a flowchart showing processing of the third modification (corresponding to FIG. 8A) in the display apparatus.
Figure 9B:
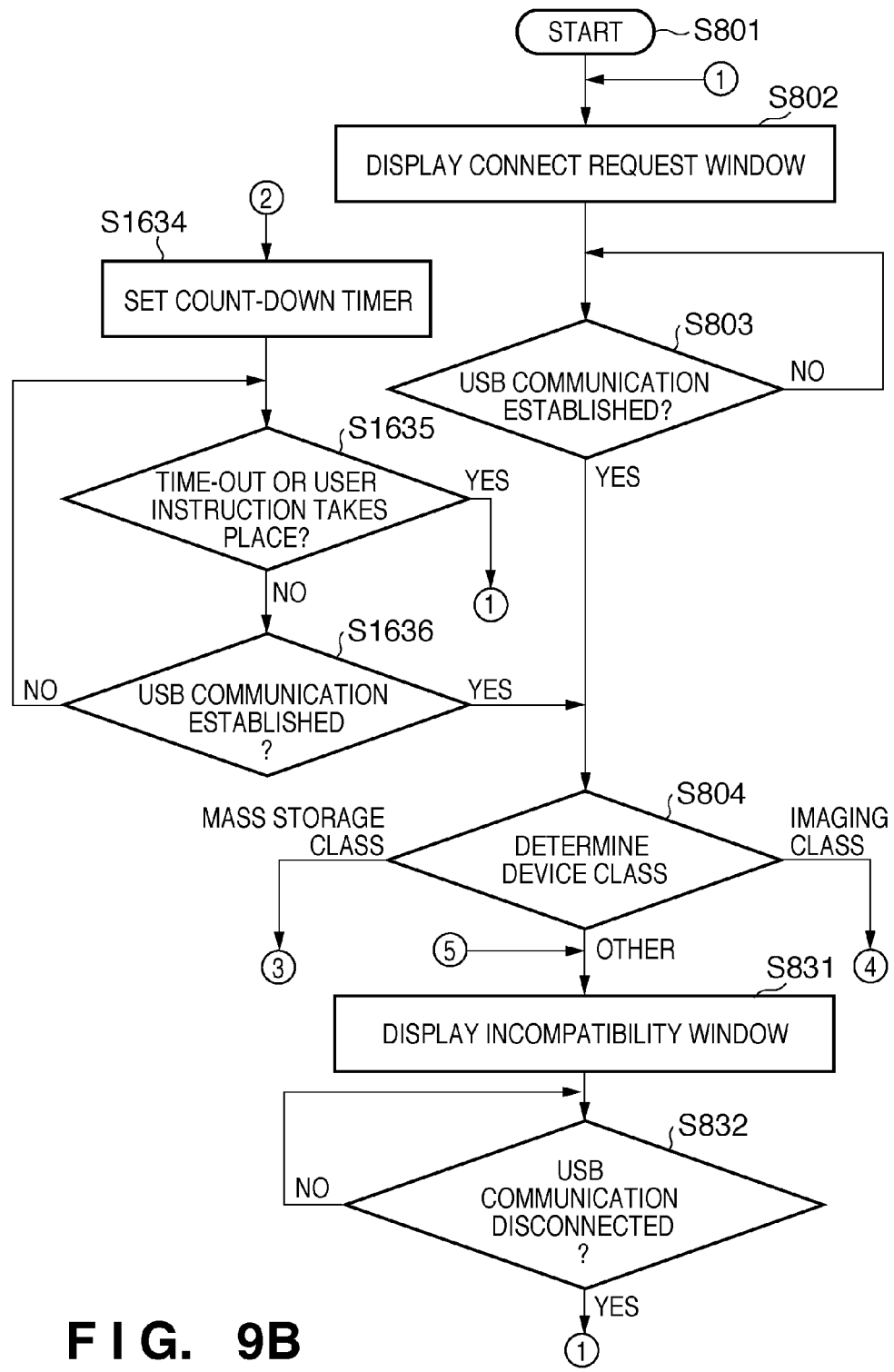
FIG. 9B is a flowchart showing processing of the third modification (corresponding to FIG. 4A) in the display apparatus.

The third modification, which further modifies the processing of the aforementioned second modification, will be described below with reference to the flowcharts shown in FIGS. 9A and 9B. Note that the same step numbers denote the same processes, and a repetitive description thereof will be avoided. As shown in FIGS. 9A and 9B, in the third modification, step S1533 is replaced by step S1633 in the sequence of the CPU 107 exemplified in FIG. 8A (FIG. 9A), and steps S1634 to S1636 are added in the sequence of the CPU 107 exemplified in FIG. 4A (FIG. 9B).

The CPU 107 determines in step S1633 using the insertion detector 121 whether or not a USB plug is physically removed from the USB connector 102. If it is determined in step S1633 that the USB plug is physically removed, the process of the CPU 107 returns to step S802. On the other hand, if it is determined that the USB plug is not physically removed, the process of the CPU 107 advances to step S1634.

In step S1634, the CPU 107 sets and starts a timer which performs a count-down operation for a predetermined period (second period) specified in advance in the ROM or the like. If the CPU 107 determines in step S1635 that the timer started in step S1634 reaches a time-out, or the user issues an instruction on the control panel 101, the process returns to step S802.

In step S1636, the CPU 107 sends an inquiry to the USB host controller 110 to determine whether or not the USB device is connected, and a USB communication is established. If it is determined in step S1636 that the USB communication is established, the process of the CPU 107 advances to step S804. On the other hand, if it is determined that the USB communication is not established, the process of the CPU 107 returns to step S1635. Therefore, in steps S1634 to S1636, the processing waits before the user issues an instruction or the second period set by the timer elapses until the USB communication is established.

As described above, in the third modification, when the USB plug is physically removed and the USB communication is disconnected while the projection display operation of image data stored in the connected USB device is in progress, the display apparatus 1 overwrites the image whose projection display operation is in progress by the connection request window. On the other hand, when it is determined that the USB plug is not physically removed, the image whose projection display operation is in progress is not overwritten by the connection request window until the second period elapses or the user issues an instruction. Hence, the display apparatus 1 can eliminate occurrence of situations that the image display operation is unwantedly ended in a case in which the user intends to browse images and that the image display operation is unwantedly continued in a case in which the user intends to end image browsing.

[Fourth Modification]

Figure 10A:
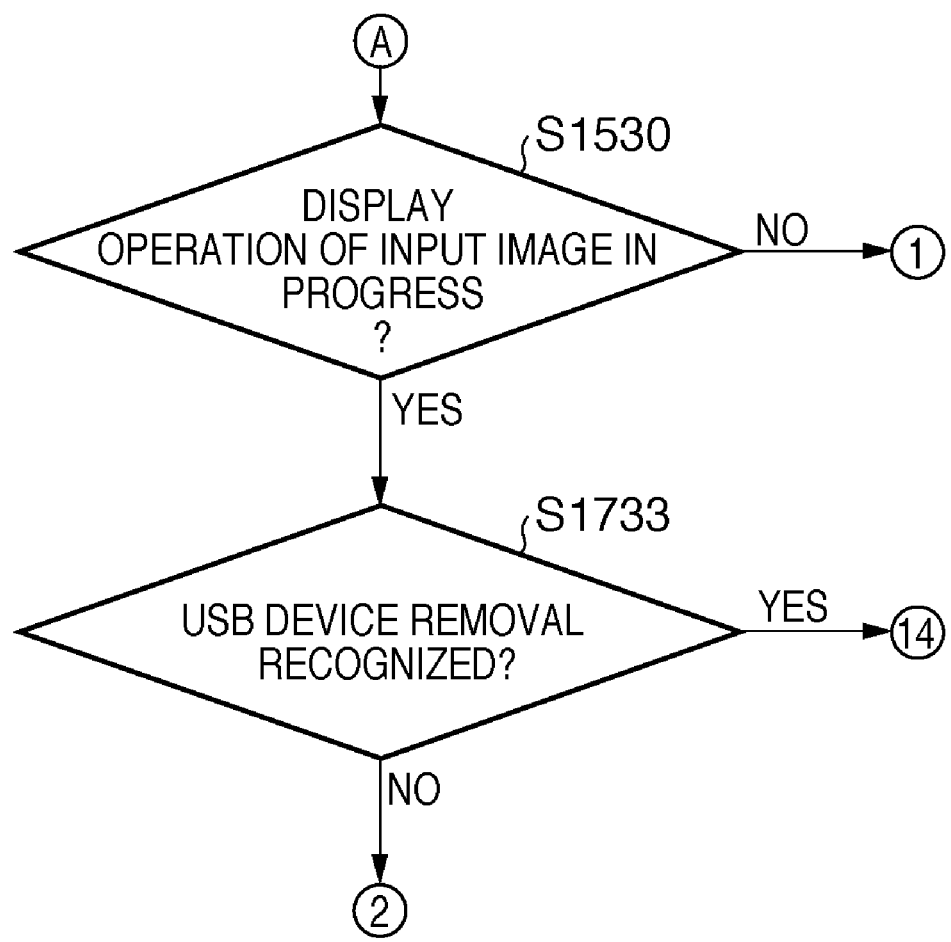
FIG. 10A is a flowchart showing processing of the fourth modification (corresponding to FIG. 9A) in the display apparatus.
Figure 10B:
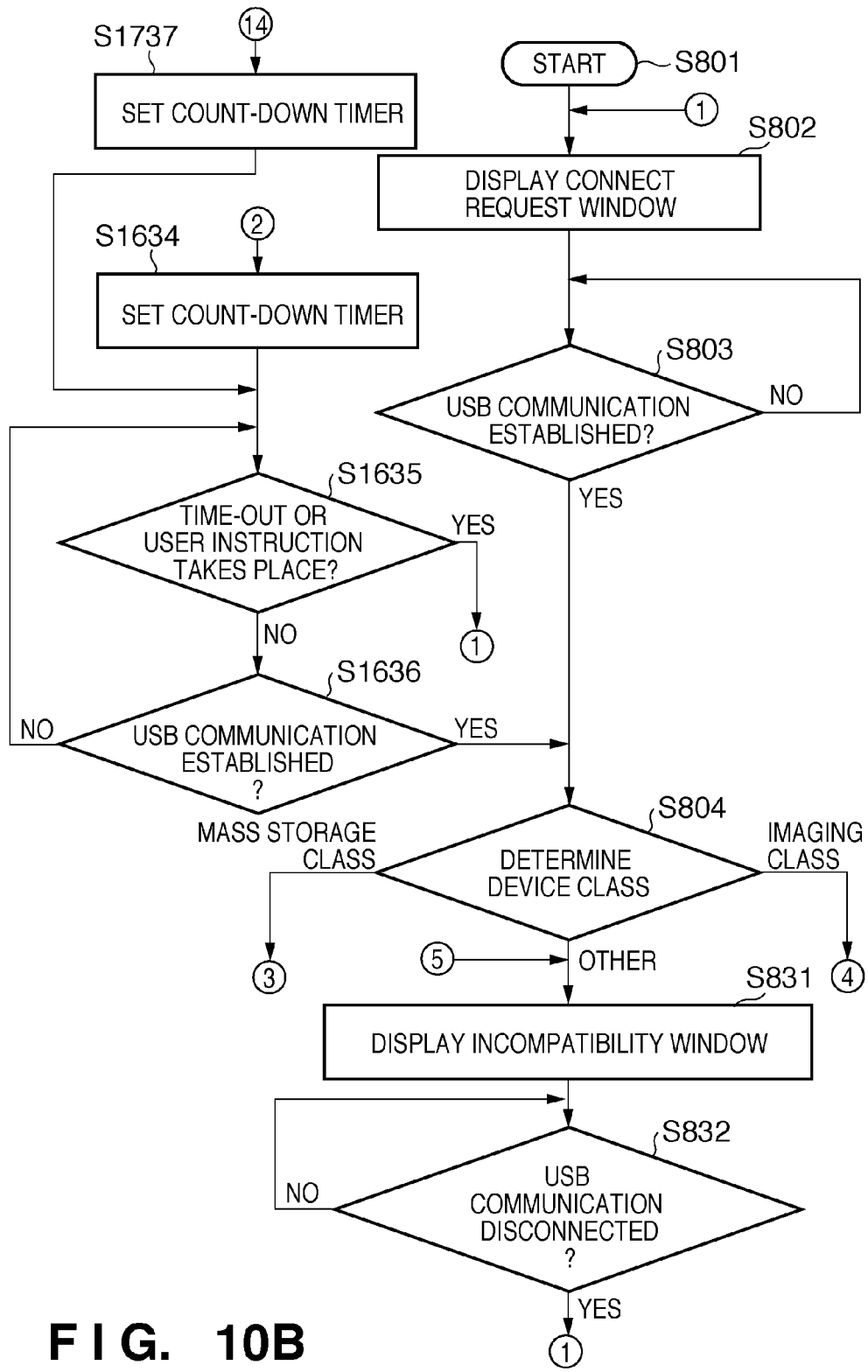
FIG. 10B is a flowchart showing processing of the fourth modification (corresponding to FIG. 9B) in the display apparatus.

The fourth modification that further modifies the aforementioned third modification will be described below with reference to the flowcharts shown in FIGS. 10A and 10B. Note that the same step numbers denote the same processes, and a repetitive description thereof will be avoided. As shown in FIGS. 10A and 10B, in the fourth modification, step S1633 is replaced by step S1733 in the sequence of the CPU 107 exemplified in FIG. 9A (FIG. 10A), and step S1737 is added to the sequence of the CPU 107 exemplified in FIG. 9B (FIG. 10B).

The CPU 107 determines in step S1733 using the insertion detector 121 whether or not a USB plug is physically removed from the USB connector 102. If it is determined in step S1733 that the USB plug is physically removed, the process of the CPU 107 advances to step S1737. On the other hand, if it is determined that the USB plug is not physically removed, the process of the CPU 107 advances to step S1634.

In step S1737, the CPU 107 sets and starts a timer which performs a count-down operation for a predetermined period (first period) which is set in advance in the ROM or the like, and is shorter than the second period set in step S1634.

As described above, in the fourth modification, when the USB plug is physically removed, and a USB communication is disconnected while the projection display operation of image data stored in the connected USB device is in progress, the display apparatus 1 overwrites the image whose projection display operation is in progress by the connection request window. The connection request window is overwritten when the first period set to be shorter than the second period elapses or when the user issues an instruction. On the other hand, when it is determined that the USB plug is not physically removed, the image whose projection display operation is in progress is not overwritten by the connection request window until the second period set to be longer than the first period elapses or the user issues an instruction.

Note that the description of the aforementioned embodiment is merely an example, and the present invention is not limited to this. The arrangement and operation in the aforementioned embodiment can be modified as needed. For example, the projector has been exemplified as the display apparatus in this embodiment, but a PDP, LCD, SED, CRT monitor, and the like may be used. Note that "PDP" is an abbreviation for "Plasma Display Panel". Also, "LCD" is an abbreviation for "Liquid Crystal Display". "SED" is an abbreviation for "Surface-Conduction Electron-emitter Display". Furthermore, "CRT" is an abbreviation for "Cathode Ray Tube".

This embodiment has exemplified the arrangement using USB, but the present invention is not particularly limited to this. For example, an SDIO (Secure Digital Input/Output) interface and other interfaces may be used. Furthermore, as an external storage device using a USB mass storage, an SD (Secure Digital) card memory, CF card, and the like may be used.

In the second, third, and fourth modifications, the insertion detector 121, which is a mechanism for detecting a physical contact of the connector, is used as means for detecting a physical connection of the USB plug, but the detection mechanism is not particularly limited. For example, as another means for detecting a physical connection of the USB plug, a current amount that flows through the VBUS line may be measured, and if the measured current amount exceeds a predetermined value, it may be determined that the USB plug is physically connected.

Other Embodiments

The aforementioned embodiments can be implemented in a software manner by a computer (or a CPU, MPU, etc.) of a system or apparatus. Therefore, a computer program itself supplied to the computer to implement the aforementioned embodiments using the computer implements the present invention. That is, the computer program itself required to implement the functions of the aforementioned embodiments is one invention of the present invention.

Note that the form of the computer program required to implement the aforementioned embodiments is not particularly limited as long as that program is computer-readable. For example, the program may adopt the forms of an object code, a program to be executed by an interpreter, script data to be supplied to an OS, and the like, but the present invention is not limited to them. The computer program required to implement the aforementioned embodiments is supplied to the computer via a storage medium or wired/wireless communications. As the storage medium for supplying the program, for example, magnetic storage media such as a flexible disk, hard disk, and magnetic tape, optical/magneto-optical storage media such as an MO, CD, and DVD, a nonvolatile semiconductor memory, and so forth may be used.

As a computer program supply method using the wired/wireless communications, a method using a server on a computer network is available. In this case, a server stores a data file (program file) that can be a computer program which forms the present invention. The program file may be either an executable format file or source codes. Then, the program file is supplied by downloading to a client computer that has accessed the server. In this case, the program file may be segmented into a plurality of segment files, which may be allocated on different servers. That is, the server which provides the program file required to implement the aforementioned embodiments to the client computer is also one invention of the present invention.

Also, a storage medium, which stores the encrypted program required to implement the aforementioned embodiments, may be delivered, and key information required to decrypt the encrypted program may be supplied to the user who meets a predetermined condition, so as to allow that user to install the program on a computer of the user. The key information can be supplied to the user by making him or her download it from a homepage via, for example, the Internet. The computer program required to implement the aforementioned embodiments may use the functions of an OS which already runs on the computer. Furthermore, some functions of the computer program required to implement the aforementioned embodiments may be configured by firmware which runs on an expansion board or the like attached to the computer, or may be executed by a CPU equipped on the expansion board or the like.

The present invention is not limited to the above embodiments and various changes and modifications can be made within the spirit and scope of the present invention. Therefore, to apprise the public of the scope of the present invention, the following claims are appended.

This application claims the benefit of Japanese Patent Application No. 2008-141678, filed May 29, 2008, which is hereby incorporated by reference herein in its entirety.

The invention claimed is:

1. A display apparatus comprising:
a communication unit configured to communicate with an external device;
a display unit configured to display an image received from the external device;
a storing unit configured to store information for controlling whether or not to continue the display of the image being displayed by the display unit when the communication is disconnected, wherein said information includes at least one of information indicating types of external devices for which display of an image should be continued and information indicating types of external devices for which display of an image should not be continued;
a determination unit configured to determine whether or not to continue the display of the image received from the external device by comparing the type of the external device involving the communication by the communication unit with said information stored in the storing unit; and
a control unit configured to control whether or not to continue the display of the image being displayed by the display unit when the communication is disconnected, in accordance with the determination result by the determination unit.

2. The display apparatus according to claim 1, wherein said information stored in the storing unit includes information indicating types of external devices which logically disconnect the communication with the communication unit.

3. The display apparatus according to claim 2, wherein the control unit controls to continue the display of the image being displayed by the display unit when the communication is disconnected, if the type of the external device is one of the types of external devices which logically disconnect the communication with the communication unit.

4. The display apparatus according to claim 1, wherein the control unit controls to end the display of the image being displayed by the display unit when the communication is disconnected, if the type of the external device is in a USB Mass Storage Class.

5. The display apparatus according to claim 1, wherein the control unit controls to continue the display of the image being displayed by the display unit when the communication is disconnected, if the type of the external device is in a USB Imaging Class.

6. A display apparatus comprising:
a communication unit configured to communicate with an external device;
a display unit configured to display an image received from the external device;
a determination unit configured to determine whether or not to continue the display of the image received from the external device by detecting whether the communication is physically disconnected or whether the communication is logically disconnected when the communication with the external device is disconnected; and
a control unit configured to control whether or not to continue the display of the image being displayed by the display unit when the communication is disconnected, in accordance with the determination result by the determination unit.

7. The display apparatus according to claim 6, wherein, when the communication with the external device is physically disconnected, the control unit controls to end the display of the image being displayed by the display unit after a predetermined first period elapses.

8. The display apparatus according to claim 7, wherein, when the communication with the external device is logically disconnected, the control unit controls to end the display of the image being displayed by the display unit after a predetermined second period, which is longer than the first period, elapses.

9. The display apparatus according to claim 6, wherein the communication unit is connected to the external device via a physical communication interface.

10. A control method of a display apparatus which comprises:
a communication unit configured to communicate with an external device;
a display unit configured to display an image received from the external device; and
a storing unit configured to store information for controlling whether or not to continue the display of the image being displayed by the display unit when the communication is disconnected, wherein said information includes at least one of information indicating types of external devices for which display of an image should be continued and information indicating types of external devices for which display of an image should not be continued,
the method comprising:
a determination step of determining whether or not to continue the display of the image received from the external device by comparing the type of the external device involving the communication by the communication unit with said information stored in the storing unit; and
a control step of controlling whether or not to continue the display of the image being displayed by the display unit when the communication is disconnected, in accordance with the determination result in the determination step.

11. A control method of a display apparatus which comprises:
a communication unit configured to communicate with an external device; and a display unit configured to display an image received from the external device, the method comprising:

a determination step of determining whether or not to continue the display of the image received from the external device by detecting whether the communication is physically disconnected or whether the communication is logically disconnected when the communication with the external device is disconnected; and a control step of controlling whether or not to continue the display of the image being displayed by the display unit when the communication is disconnected, in accordance with the determination result in the determination step.

* * * * *